United States Patent
Henningsen et al.

(10) Patent No.: US 8,696,792 B2
(45) Date of Patent: Apr. 15, 2014

(54) PROCESS AND SYSTEM FOR REMOVING IMPURITIES FROM A GAS

(75) Inventors: Gunnar Henningsen, Summerfield, FL (US); Teddy Merrill Knowlton, Willowbrook, IL (US); John George Findlay, Homer Glen, IL (US); Jerry Neal Schlather, Kingsport, TN (US); Brian S. Turk, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 87 days.

(21) Appl. No.: 13/498,821

(22) PCT Filed: Sep. 28, 2010

(86) PCT No.: PCT/US2010/050556
§ 371 (c)(1),
(2), (4) Date: Apr. 17, 2012

(87) PCT Pub. No.: WO2011/041317
PCT Pub. Date: Apr. 7, 2011

(65) Prior Publication Data
US 2012/0192711 A1 Aug. 2, 2012

Related U.S. Application Data

(60) Provisional application No. 61/247,282, filed on Sep. 30, 2009.

(51) Int. Cl.
*B01D 53/08* (2006.01)
*B01D 53/48* (2006.01)
*B01D 53/64* (2006.01)

(52) U.S. Cl.
USPC .......... 95/13; 95/19; 95/108; 95/133; 95/135; 96/111; 96/113; 96/150; 422/144; 422/145; 422/147; 423/244.01

(58) Field of Classification Search
USPC ......... 95/12, 13, 19, 107, 108, 135–137, 133; 96/111, 113, 123, 150; 422/139, 144, 422/145, 147; 423/244.01
See application file for complete search history.

(56) References Cited

U.S. PATENT DOCUMENTS 2,606,938 A * 8/1952 Robinson ...................... 585/800
2,684,124 A 7/1954 Hines, Jr.
(Continued)

FOREIGN PATENT DOCUMENTS

| WO | 0218043 | 3/2002 |
| WO | 0222763 | 3/2002 |
| WO | WO 03/084656 | 10/2003 |

OTHER PUBLICATIONS

Wen-Ching Yang, Handbook of Fluidization and Fluid-Particle Systems, Chapter 21: Standpipes and Nonmechanical Valves, Jan. 1, 2003, pp. 571-597, Marcel Dekker Inc.

(Continued)

*Primary Examiner* — Frank Lawrence, Jr.
(74) *Attorney, Agent, or Firm* — Womble Carlyle Sandridge & Rice, LLP

(57) ABSTRACT

A fluidized reactor system for removing impurities from a gas and an associated process are provided. The system includes a fluidized absorber for contacting a feed gas with a sorbent stream to reduce the impurity content of the feed gas; a fluidized solids regenerator for contacting an impurity loaded sorbent stream with a regeneration gas to reduce the impurity content of the sorbent stream; a first non-mechanical gas seal forming solids transfer device adapted to receive an impurity loaded sorbent stream from the absorber and transport the impurity loaded sorbent stream to the regenerator at a controllable flow rate in response to an aeration gas; and a second non-mechanical gas seal forming solids transfer device adapted to receive a sorbent stream of reduced impurity content from the regenerator and transfer the sorbent stream of reduced impurity content to the absorber without changing the flow rate of the sorbent stream.

55 Claims, 7 Drawing Sheets

(56) References Cited

U.S. PATENT DOCUMENTS

| | | | |
|---|---|---|---|
| 2,763,597 A * | 9/1956 | Martin et al. | 208/136 |
| 2,782,866 A | 2/1957 | Etherington et al. | |
| 3,821,103 A * | 6/1974 | Owen et al. | 208/72 |
| 3,957,459 A * | 5/1976 | Mitchell et al. | 48/197 R |
| 4,032,305 A | 6/1977 | Squires | |
| 4,239,742 A | 12/1980 | Blanton, Jr. | |
| 4,247,987 A | 2/1981 | Coulaloglou et al. | |
| RE33,393 E | 10/1990 | Kidd | |
| 4,990,318 A | 2/1991 | Kidd | |
| 5,045,522 A | 9/1991 | Kidd | |
| 5,094,996 A | 3/1992 | Kidd | |
| 5,102,854 A | 4/1992 | Delzer | |
| 5,130,097 A | 7/1992 | Bissett | |
| 5,130,288 A | 7/1992 | Delzer | |
| 5,143,706 A | 9/1992 | Schubert | |
| 5,151,257 A | 9/1992 | Kidd | |
| 5,174,919 A | 12/1992 | Cymbaluk | |
| 5,177,050 A | 1/1993 | Schubert | |
| 5,178,843 A | 1/1993 | Delzer | |
| 5,219,542 A | 6/1993 | Lowery | |
| 5,248,489 A | 9/1993 | Kidd | |
| 5,250,089 A | 10/1993 | Delzer | |
| 5,254,516 A | 10/1993 | Gupta | |
| 5,268,152 A | 12/1993 | Delzer | |
| 5,281,445 A | 1/1994 | Khare | |
| 5,310,717 A | 5/1994 | Delzer | |
| 5,358,921 A | 10/1994 | Kidd | |
| 5,360,468 A | 11/1994 | Schubert | |
| 5,366,717 A | 11/1994 | Dorchak | |
| 5,370,848 A | 12/1994 | Delzer | |
| 5,439,867 A | 8/1995 | Khare | |
| 5,447,702 A | 9/1995 | Campbell et al. | |
| 5,494,880 A | 2/1996 | Siriwardane | |
| 5,560,900 A | 10/1996 | Gbordzoe | |
| 5,567,228 A | 10/1996 | Abdulally | |
| 5,578,093 A | 11/1996 | Campbell et al. | |
| 5,703,003 A | 12/1997 | Siriwardane | |
| 5,710,091 A | 1/1998 | Khare | |
| 5,714,431 A | 2/1998 | Gupta et al. | |
| 5,798,088 A | 8/1998 | Dorchak | |
| 5,866,503 A | 2/1999 | Siriwardane | |
| 5,904,750 A * | 5/1999 | Cowles | 95/109 |
| 5,914,288 A | 6/1999 | Turk et al. | |
| 5,972,835 A | 10/1999 | Gupta | |
| 6,306,793 B1 | 10/2001 | Turk et al. | |
| 6,479,429 B1 | 11/2002 | Khare | |
| 6,649,555 B2 | 11/2003 | Dodwell | |
| 6,656,877 B2 | 12/2003 | Sughrue | |
| 6,743,405 B1 | 6/2004 | Siriwardane | |
| 6,812,189 B1 | 11/2004 | Vierheilig | |
| 6,890,877 B2 | 5/2005 | Meier | |
| 6,930,074 B2 | 8/2005 | Khare | |
| 6,951,635 B2 | 10/2005 | Gangwal et al. | |
| 7,067,093 B2 | 6/2006 | Vierheilig | |
| 7,241,929 B2 | 7/2007 | Sughrue | |
| 7,259,286 B2 | 8/2007 | Jothimurugesan | |
| 7,682,423 B2 | 3/2010 | Gangwal | |
| 2003/0035770 A1 | 2/2003 | Cole | |
| 2003/0047489 A1 | 3/2003 | Khare | |
| 2003/0114299 A1 | 6/2003 | Khare | |
| 2003/0118495 A1 | 6/2003 | Khare | |
| 2003/0232723 A1 | 12/2003 | Dodwell | |
| 2004/0004023 A1 | 1/2004 | Sughrue | |
| 2004/0004029 A1 | 1/2004 | Khare | |
| 2004/0120875 A1 | 6/2004 | Morton | |
| 2005/0098478 A1 | 5/2005 | Gupta | |
| 2009/0020405 A1 | 1/2009 | Fan et al. | |
| 2009/0196809 A1 | 8/2009 | Schmidt et al. | |

OTHER PUBLICATIONS

International Search Report for International Application No. PCT/US2010/050556.

Written Opinion of the International Searching Authority for International Application No. PCT/US2010/050556.

Amendments Under Article 34 and Response to First Written Opinion on Preliminary Examination for International Application No. PCT/US2010/050556.

Written Opinion of the International Preliminary Examining Authority for International Application No. PCT/US2010/050556.

Amendments Under Article 34 and Response to Second Written Opinion on Preliminary Examination for International Application No. PCT/US2010/050556.

International Preliminary Report on Patentability for International Application No. PCT/US2010/050556.

Jensen, et al., Preparation of ZnO-Al2O3 Particles in a Premixed Flame, Journal of Nanoparticle Research, vol. 2, pp. 363-373, 2000 Kluwer Academic Publishers.

* cited by examiner

PROCESS AND SYSTEM FOR REMOVING IMPURITIES FROM A GAS

FEDERALLY SPONSORED RESEARCH OR DEVELOPMENT

This invention was made with government support under United States Department of Energy—National Energy Technology Laboratory (NETL) Contract DE-AC26-99FT40675 awarded by the Department of Energy. The United States Government has certain rights in the invention.

BACKGROUND OF THE INVENTION

1. Field of the Invention

The present invention relates to novel processes and systems for the removal of impurities, such as sulfur compounds, hydrogen chloride, arsenic, selenium, hydrogen cyanide, ammonia, and combinations thereof, from a gas stream by a solid sorbent stream which is simultaneously regenerated to remove the impurities.

2. Description of Related Art

Removal of impurities from gas streams is desirable in numerous instances to address various process, environmental, chemical, and/or other industrial considerations as will be apparent to the skilled artisan. For example, "synthesis gas" or "syngas" produced by the gasification of fossil fuels such as coal, or other carbonaceous materials is becoming increasingly important as a viable alternative energy source and as an important raw material source for the industrial synthesis of various organic chemicals. However, syngas often contains various impurities, such as sulfur, arsenic, and selenium compounds, which are desirably removed in whole or part to facilitate subsequent processing and/or use of the gas. In particular, the gasification of coal, heavy oil fractions, and some types of carbonaceous waste, typically produces a syngas containing gaseous impurities such as hydrogen sulfide, carbonyl sulfide, hydrogen selenide, arsine, and the like. These impurities can be corrosive or toxic in some cases, and/or can act as catalyst poisons and/or environmental pollutants. There is a need, therefore, for methods to remove these compounds from synthesis gas streams in chemical processes to prevent damage to catalyst systems and to meet environmental standards.

Current commercially available processes for removing sulfur species from reducing gas streams, such as syngas, typically employ one of two methods: A) liquid phase absorption, either physical or chemical; or B) adsorption onto solid sorbents in fixed beds.

Syngas, such as that from the gasification of coal or other carbonaceous materials, generally exits a gasifier as a high temperature gas stream, typically at a temperature higher than about 900° F. (482° C.). Current liquid phase absorption methods for impurity removal are generally inefficient in the case of such high temperature gas streams because they typically operate at temperatures of about 100° F. (38° C.) or less. Therefore, large scale cooling and related heat recovery processing are necessary in the case of gasification syngas streams to allow removal of impurities at the lower temperatures required by liquid phase absorption processes. Such cooling, heat recovery and related processing steps result in thermal inefficiencies and substantial equipment cost as will be apparent.

Typically, solid sorbent, hot gas adsorption processes involve contacting a solid sorbent comprising an active metal oxide with hot gas to convert the active metal oxide into a metal compound comprising the impurity or a derivative thereof. The impurities may include, but are not limited to, sulfur, hydrogen chloride, arsenic, selenium, hydrogen cyanide, and/or ammonia. Desirable active metal oxide containing sorbent compositions and processes for sulfur removal are disclosed in U.S. Pat. No. 6,951,635 B2 issued Oct. 4, 2005 to Gangwal et al; U.S. Pat. No. 6,306,793 B1 issued Oct. 23, 2001 to Turk et al; U.S. Pat. No. 5,972,835 issued Oct. 26, 1999 to Gupta; U.S. Pat. No. 5,914,288 issued Jun. 22, 1999 to Turk et al; and U.S. Pat. No. 5,714,431 issued Feb. 3, 1988 to Gupta et al; which are each hereby incorporated herein by reference in their entireties.

Following the adsorption reaction and depending on the impurity, the impurity loaded sorbent is regenerated at high temperature. In other cases, the impurity loaded sorbent is discarded. If the sorbent is regenerated, hot gases containing impurities are typically produced during the regeneration step. In these cases the impurities can be typically separated from the regenerator off-gas for disposal or downstream processing. For example, in the case where syngas contains a sulfur impurity, regeneration of the sulfur loaded sorbent with an oxidizing gas stream, typically oxygen or an oxygen containing gas, produces sulfur dioxide which can be absorbed and/or converted to sulfuric acid, elemental sulfur or the like. In particular, the regeneration reaction converts the metallic sulfide back to metallic oxide via the following reaction:

$$MS + 3/2 O_2 \rightarrow MO + SO_2 \qquad (I)$$

wherein M is the active metal present in the sorbent, for instance Zn; MO represents a metal oxide; and MS represents a metal sulfide. The skilled artisan will understand that although oxidation is a preferred means of regenerating active metal oxide sorbents, other methods, such as thermal regeneration, also may be possible, particularly in the case of different solid sorbent compositions.

Fluidized bed adsorption and absorption/regeneration processes are known in the art and are disclosed for example in the previously identified US patent publications of Gangwal et al, Gupta et al, and Turk et al. Coupled fluidized bed reactor/regeneration systems are also known and used in the processing of hydrocarbons, for example in Fluid Catalytic Cracking (FCC) processes.

Dual loop fluidized bed absorption/regeneration processes for removing sulfur contaminants from hydrocarbon gases such as syngas, are disclosed in U.S. Pat. Nos. 5,447,702 and 5,578,093, issued Sep. 5, 1995 and Nov. 26, 1996, respectively, to Campbell et al, which are hereby incorporated herein by reference. In such dual loop processes, absorption and sorbent regeneration are simultaneously conducted in coupled fluidized beds. In these dual loop processes, the solids flow rate of the sorbent through the absorber can be different than the solids flow rate of the sorbent through the regenerator. In particular, the sorbent stream exiting the absorber can be separated into two streams, a recycle stream which is recycled to the absorber, and a regeneration stream which is passed to the regeneration zone for removal of absorbed sulfur. The regenerated sorbent stream exiting the regenerator is returned to the absorber where it is mixed with the recycled sorbent. However, in order to achieve steady state operation and establish equilibrium between absorption and regeneration in such dual loop processes, the quantity of sulfur removed from the sorbent in the regenerator must match the quantity of sulfur removed from the feed gas in the absorber. In turn, since the quantity, i.e., flow rate, of sorbent solids passing through the absorber exceeds the quantity of sorbent solids passing through the regenerator, the sulfur pick-up in the absorber, as a percentage of sorbent weight, must be lower than the sulfur removal rate in the regenerator, based on sorbent weight.

In practice, long term, steady state operation of the dual loop absorber/regenerator fluidized bed reactor systems disclosed in Campbell et al. can present problems since process changes in either loop must be accompanied by corresponding changes in the other loop in order to maintain stable continuous operation. For example, variations in the composition, feed rate, temperature, pressure, etc., of the feed gas fed to the absorber can cause long term and short term variations in the rate of sulfur removal from the feed gas in the absorber (with a corresponding change in weight percent sulfur pick-up by the sorbent, based on sorbent weight), requiring corresponding process and/or sorbent flow rate variations in the regenerator for the maintenance of stable continuous operation. Moreover, conventional mechanical valves such as the solids plug valves disclosed by Campbell et al. as a means for varying the flow rates of sorbent solids to the absorber and/or regenerator, are subject to erosion, plugging and other problems due to the high temperature, high pressure, and corrosive and abrasive conditions inherent in the desulfurization processes disclosed by Campbell et al.

SUMMARY OF THE INVENTION

The present invention comprises, in one embodiment, a process and apparatus for removing impurities from a gas by treating the gas with a solid sorbent while simultaneously achieving continuous sorbent regeneration under controlled conditions and controlled solid flow rates. In advantageous embodiments of the invention, dual-loop and multi-loop, fluidized bed, absorber/regenerator processes are provided having enhanced long term stability. In particular, advantageous embodiments of the invention can provide enhanced control of solids flow rates between loops of multi-loop fluidized absorber/regenerator processes to accommodate a variety of process designs and operational process variations; and/or can provide self correcting action in response to changing process conditions, flow rate variations and the like, between the loops; without reliance on mechanical valves which are subject to problems and potential failure at high temperature, high pressure, corrosive and/or abrasive conditions. Additional advantageous embodiments of the invention provide enhanced process control for balancing impurity removal in the regenerator with impurity removal in the absorber despite process variations in the absorber and regenerator loops. In other aspects, the present invention can provide control of the solids flow in a multi-loop fluidized reactor system between a holding vessel and a fluidized zone of a fluidized reactor system without the use of mechanical valves.

In one embodiment of the invention, separate loops of multi-loop fluidized absorber and regenerator processes are fluidly connected to allow continuous solids flow between the loops while providing a gas seal between the two loops to prevent mixing of the feed and regeneration gases. An impurity containing feed gas stream is contacted with a solid sorbent stream in a fluidized absorber zone under conditions sufficient to reduce the impurity content of the gas stream and increase the impurity loading of the solid sorbent stream. An impurity loaded solid sorbent stream is removed from the absorber zone and at least a portion of the impurity loaded solid sorbent stream is passed to a first non-mechanical gas seal forming solids transfer zone which is fluidly connected to a fluidized solids regenerator zone and adapted to transfer solids into the regenerator zone. The first non-mechanical gas seal forming solids transfer zone is constructed for operation in the "valve mode" wherein solids are passed through the transfer zone at a controllable flow rate. In particular, non-mechanical gas seal forming solids transfer zones operating in the valve mode are capable of varying the flow rate of solid streams through the zone in response to variations in the feed rate of an "aeration gas" fed to the solids transfer zone as discussed in greater detail subsequently. The impurity loaded solid sorbent stream exiting the solids transfer zone is admitted into the regenerator zone and contacted with a regeneration feed gas to provide a regenerated sorbent stream having a reduced impurity content. The regenerated sorbent stream exiting the regenerator zone is passed to a second non-mechanical gas seal forming solids transfer zone which is fluidly connected to the absorber zone and adapted to transfer the regenerated sorbent stream to the absorber zone. The second non-mechanical gas seal forming solids transfer zone is constructed for operation in the "automatic mode" wherein solids are passed through the transfer zone at the same flow rate as the feed rate of solids into the zone. Thus the second non-mechanical transfer zone transfers the regenerated sorbent stream to the absorber at the flow rate of the regenerated sorbent stream exiting the regenerator and also maintains a pressure seal between the regenerator and absorber zones.

The use of non-mechanical solids transfer devices, or zones, to control and accomplish the solids transfer in the multi-loop absorber-regenerator system minimizes or avoids the capital cost and potential system upsets associated with maintenance and mechanical failures of mechanical valves. The combination and arrangement of valve mode and automatic mode non-mechanical solids transfer devices in accordance with this aspect of the invention can allow relatively consistent solids flow rates between and through the absorber and regenerator while maintaining stable pressure seals to prevent mixing of absorber and regenerator feed and/or effluent gases. Nevertheless, the arrangement of valve mode and automatic mode non-mechanical solids transfer devices in accordance with this aspect of the invention can also accommodate variations in gas feed rates and reaction conditions in the regenerator and/or the absorber as may be desirable for various purposes, for example, to maintain balance between impurity removal in the absorber and sorbent regeneration, and/or to accommodate variations in feed rate and/or impurity content of the feed gas treated in the absorber.

Numerous gas seal forming, non-mechanical, solids transfer devices of various constructions and arrangements are known to the skilled artisan, and are described, for example, in Wen-Chen Yang, "HANDBOOK of FLUIDIZATION and FLUID-PARTICLE SYSTEMS", Marcel Dekker, Inc, 2003, Chapter 21, pages 521-597, which is hereby incorporated herein by reference. In general, such solid flow devices use an aeration gas in conjunction with a predetermined geometrical shape to cause particulate solids to flow through the device. The solid flow devices can be constructed for operation in a "valve mode", in which the flow rate of solids through the device is controlled by aeration gas flow rate, or in an "automatic mode" in which the flow rate of solids through the device is controlled by the flow rate of solids into the device. Such solids transfer devices also provide a gas seal of a predetermined pressure value to prevent the flow of process gases, i.e., absorber or regenerator process gases, through the device. The capability of the gas seal to withstand predetermined pressures can be adjusted by variations in the geometrical shapes and sizes of the devices as will be apparent to the skilled artisan. Advantageously, a "J-Leg" solid flow device adapted for operation in the valve mode, (also called a "J-Valve"), is used to transfer the impurity loaded solid sorbent stream removed from the absorber zone to the regeneration zone. A "Loop Seal" solid flow device, operating in the automatic mode, is advantageously used to transfer the regenerated solid sorbent stream recovered from the regenerator zone, to the absorber zone at the same flow rate as the regenerated sorbent stream is fed out of the regenerator zone.

Thus the absorber loop and the regenerator loop are fluidly connected allowing sorbent streams to be continuously passed between the two loops even though the absorber and regenerator process gas streams in the two loops are maintained separate from each other. Because of the non-mechanical construction of the solids transfer devices, various problems associated with mechanical valves, such as wear, corrosion, and seizure of the moving parts, plugging of valve orifices, etc., can be avoided. Nevertheless, significant gas pressure upsets that could result in failure of the gas seal capabilities of the solids transfer zones are eliminated or minimized by the combination and arrangement of valve mode and automatic mode solids transfer devices, thus allowing self-regulating flow of a solid material between the two fluidized reactor loops. Moreover the invention can also alleviate or minimize the difficulties associated with dual loop absorber and regenerator processes wherein the sorbent solids flow rates can vary between the loops.

In advantageous embodiments, the invention provides for removal of at least one sulfur impurity from a hot hydrocarbon or hydrocarbon-derived feed gas such as syngas. The sorbent advantageously comprises an active metal oxide, such as iron oxide, zinc oxide, zinc ferrite, copper ferrite, copper oxide, vanadium oxide, or mixtures thereof. In one embodiment, the sorbent has an average particle diameter from 50 to 140 microns.

The active metal oxide in the sorbent reacts with sulfur impurities in the feed gas resulting in a sulfur loaded sorbent, as represented by the following reactions:

$$H_2S + MO \rightarrow H_2O + MS \qquad (II)$$

$$COS + MO \rightarrow CO_2 + MS \qquad (III)$$

wherein M is the metal present in the sorbent, for instance Zn; MO represents a metal oxide; and MS represents a metal sulfide.

In advantageous embodiments of the invention, the fluidized absorber zone is maintained at a temperature in the range of between about 600° F. and about 1200° F. (about 316° C. and about 649° C.) and a pressure of between about atmospheric pressure and about 1200 psig (8274 kPa), and the regenerating zone is maintained at a temperature in the range of between about 900° F. to about 1450° F. (about 482° C. to about 788° C.) and about the same pressure as the absorber. In yet further advantageous embodiments of the invention, the fluidized absorber zone is maintained at a temperature in the range of between about 700° F. and about 1000° F. (about 371° C. and about 538° C.) and a pressure of between about 200 psig and about 1000 psig (about 1379 kPa and about 6895 kPa), and the regenerating zone is maintained at a temperature in the range of between about 1200° F. and about 1450° F. (about 649° C. and about 788° C.) and about the same pressure as the absorber. The pressure of the impurity-containing feed gas typically ranges from 100 to 1200 psig.

In yet another aspect, the present invention provides a process control for controlling the flow of solid sorbent streams between separate loops of a multi-loop fluidized absorber and regenerator process. According to this aspect of the invention, the pressures of the absorber and regenerator zones are measured periodically or continuously and the pressure in at least one of the zones is adjusted as necessary to maintain a predetermined pressure difference between the pressures of the two zones. In one advantageous embodiment, the predetermined pressure difference is a pressure difference in the range of between about 1 psi and about 20 psi (about 7 kPa and about 138 kPa). In another advantageous embodiment, the predetermined pressure difference is a pressure difference in the range of between about 2 psi and about 10 psi (about 14 kPa and about 69 kPa). Advantageously, the pressure difference between the zones is maintained by adjusting the pressure of the regenerator zone. This allows the pressure in the absorber zone to change in response to changes in the pressure of an incoming impurity-containing feed gas. Advantageously, the pressure difference between the zones is maintained by adjusting the pressure of impurity laden gases exiting the regenerator zone.

In yet another aspect, the present invention provides a process control for enhancing stability of a multi-loop fluidized absorber and regenerator process wherein impurities are removed from a gaseous feed stream by contact with a solid sorbent stream in the absorber zone and at least a portion of the sorbent stream is continuously regenerated by contact with a regeneration gas in the regenerator zone. In particular, enhanced process control according to this aspect of the invention comprises a feed forward process control wherein the quantitative impurity removal rate in the absorber is monitored and if the impurity removal rate changes beyond a predetermined control value, the rate of the regenerator feed gas is adjusted as necessary to provide a stoichiometrically calculated change in the quantitative impurity removal rate in the regenerator zone. In one advantageous embodiment, the quantitative impurity removal rate in the regenerator is also monitored and compared to the quantitative impurity removal rate in the absorber. In the event that the difference between the removal rates exceeds a predetermined value, the feed rate of the regenerator feed gas is adjusted as necessary to provide a stoichiometrically calculated change in the quantitative impurity removal rate in the regenerator. In another embodiment, the impurity loading of the impurity loaded sorbent removed from the absorber is monitored and if the impurity loading differs from a predetermined loading range, the feed rate of the regenerator feed gas is adjusted to bring the impurity loading of the sorbent to a value within the predetermined loading range. In yet another embodiment, changes to the feed rate of the regenerator feed gas are determined in response to both the value of the impurity loading of the impurity loaded sorbent, and the value of the quantitative impurity removal rate in the absorber.

In one embodiment, the invention provides a process for removing impurities (e.g., sulfur compounds, arsenic and compounds thereof, and selenium and compounds thereof) from a gas, comprising:

(a) contacting an impurity containing feed gas stream with a solid sorbent stream in a fluidized absorber zone under conditions sufficient to reduce an impurity content of the feed gas stream and increase impurity loading of the solid sorbent stream (e.g., with a residence time in the absorber zone of about 3 to about 25 seconds or about 3 to about 10 seconds);

(b) removing an impurity loaded solid sorbent stream from the absorber zone and transporting at least a portion of the impurity loaded solid sorbent stream to a first non-mechanical gas seal forming solids transfer zone (e.g., a J-Leg), the first solids transfer zone being fluidly connected to a fluidized solids regenerator zone and adapted to transfer solids to the fluidized regenerator zone at a controllable flow rate in response to the flow of an aeration gas through the transfer zone;

(c) transferring the impurity loaded solid sorbent stream from the first solids transfer zone to the fluidized solids regenerator zone and contacting the impurity loaded solid sorbent stream with a regenerator feed gas (e.g., oxygen or a mixture of oxygen and at least one inert gas) in the fluidized solids regenerator zone to thereby reduce the impurity content of the impurity loaded solid sorbent stream (e.g., with a residence time in the regenerator zone of about 3 to about 25 seconds);

(d) transferring the solid sorbent stream of reduced impurity content from the fluidized regenerator zone to a second non-mechanical gas seal forming solids transfer zone (e.g., a loop seal), the second solids transfer zone being fluidly connected to the regenerator and absorber zones and adapted to transfer the solid sorbent stream of reduced impurity content to the absorber zone at the same flow rate as the flow rate of the solid sorbent stream of reduced impurity into the second solids transfer zone; and (e) recovering a purified gas stream from the absorber zone using, for example, a cyclone separator to separate the impurity loaded sorbent stream from the purified gas. Optionally, the impurity loaded sorbent stream leaving the cyclone separator can pass through a gas stripper.

The impurity loaded sorbent exiting the absorber zone can be characterized by impurity content. In one embodiment, the impurity content of the impurity loaded sorbent exiting the absorber zone ranges from 10% to 90% of the impurity adsorption capacity of the sorbent (e.g., from 30% to 75% of the impurity adsorption capacity of the sorbent). In certain embodiments, the arsenic content of the impurity loaded sorbent exiting the absorber zone ranges from 0 to 3000 ppm.

The purified gas stream recovered from the absorber zone can also be characterized by impurity content. For example, the purified gas stream recovered from the fluidized absorber zone in certain embodiments has a sulfur level of less than or equal to 50 ppm, or less than or equal to 20 ppm, or less than or equal to 10 ppm.

The process may further include transporting at least a portion of the impurity loaded solid sorbent stream removed from the fluidized absorber zone to a third non-mechanical gas seal forming solids transfer zone (e.g., a J-Leg), the third solids transfer zone being fluidly connected for receiving a solids stream from a downstream portion of the fluidized absorber zone and for delivering a solids stream to an upstream portion of the fluidized absorber zone, the third solids transfer zone being adapted to transfer solids to the fluidized absorber zone at a controllable flow rate in response to the flow of an aeration gas through the transfer zone; and transferring the impurity loaded solid sorbent stream from the third solids transfer zone to the upstream portion of the fluidized absorber zone for contact with the impurity containing feed gas stream.

The process of the invention can also include measuring the pressures of the absorber and regenerator zones; determining the pressure difference between the zones; comparing the pressure difference to at least one predetermined pressure difference value; and adjusting the pressure in at least one of the absorber and regeneration zones in response to the measuring step, such as by adjusting the pressure of impurity laden gases exiting the regenerator zone. The predetermined pressure difference value can be, for example, a pressure difference in the range of between about 1 psig and about 20 psig or between about 2 psig and about 10 psig.

In one embodiment, the process includes the steps of determining a quantitative impurity removal rate in the absorber zone; comparing the impurity removal rate to a predetermined control value; and adjusting the flow rate of the regenerator feed gas fed to the regenerator zone in response to the comparing step.

In yet another embodiment, the process includes determining a quantitative impurity removal rate in the absorber zone; determining a quantitative impurity removal rate in the regenerator zone; comparing the impurity removal rates to a predetermined control value; and adjusting the flow rate of the regenerator feed gas fed to the regenerator zone in response to the comparing step.

In still another embodiment, the process includes determining impurity loading of a sample of the impurity loaded sorbent stream removed from the absorber zone; comparing the impurity loading to a predetermined control value; and adjusting the flow rate of a regenerator feed gas fed to the regenerator zone in response to the comparing step.

When needed, heat can be provided to the fluidized regenerator zone (and the material therein) by any of a variety of methods including: 1) adding a pyrophoric additive; 2) adding a supplementary fuel; and 3) using a dry gas preheating system.

An exemplary J-Leg structure for use in the first solids transfer zone can include:

(a) a descending pipe in fluid communication with a holding vessel; and (b) a transfer pipe in fluid communication with the descending pipe to transfer the impurity loaded sorbent from the descending pipe to the fluidized regenerator zone;

and wherein the angle between the descending pipe and the transfer pipe is less than or equal to 90°. The diameter of the transfer pipe is typically less than the diameter of the holding vessel and the descending pipe optionally includes a flow restrictor. The aeration gas can be introduced into one or more of the holding vessel, the descending pipe, and the transfer pipe.

An exemplary J-Leg structure for the third solids transfer zone can include:

(a) a descending pipe in fluid communication with a holding vessel; and (b) a transfer pipe in fluid communication with the descending pipe to transfer the separated impurity loaded sorbent from the descending pipe to the fluidized absorber zone;

and wherein the angle between the descending pipe and the transfer pipe is less than or equal to 90°. As noted above, the diameter of the transfer pipe is typically less than the diameter of the holding vessel and the descending pipe optionally includes a flow restrictor. The aeration gas is typically introduced into one or more of the holding vessel, the descending pipe, and the transfer pipe.

In yet another aspect of the invention, a fluidized reactor system for removing impurities from a gas, the system including:

(a) a fluidized absorber adapted for contacting an impurity containing feed gas stream with a solid sorbent stream zone under conditions sufficient to reduce the impurity content of the feed gas stream and increase the impurity loading of the solid sorbent stream;

(b) a fluidized solids regenerator adapted for contacting an impurity loaded solid sorbent stream with a regeneration gas under conditions sufficient to reduce the impurity content of the impurity loaded solid sorbent stream;

(c) a first non-mechanical gas seal forming solids transfer device in fluid communication with the fluidized absorber, the fluidized solids regenerator, and a supply of aeration gas, the first non-mechanical gas seal forming solids transfer device being adapted and arranged to receive an impurity loaded solid sorbent stream from the absorber and to transport the impurity loaded solid sorbent stream to the fluidized regenerator at a controllable flow rate in response to the aeration gas; and (d) a second non-mechanical gas seal forming solids transfer device fluidly connected to the fluidized regenerator and the fluidized absorber, and being adapted to receive a solid sorbent stream of reduced impurity content from the fluidized regenerator and to transfer the solid sorbent stream of reduced impurity content to the fluidized absorber without changing the flow rate of the solid sorbent stream of reduced impurity content.

The system can also include a third non-mechanical gas seal forming solids transfer device fluidly connected to a downstream portion of the fluidized absorber, an upstream portion of the fluidized absorber, and a supply of aeration gas, and being adapted and arranged to receive a solids stream from the downstream portion of the fluidized absorber and transfer solids to the upstream portion of the fluidized absorber at a controllable flow rate in response to the aeration gas. Both the first and third non-mechanical gas seal forming solids transfer devices can include a J-Leg as disclosed herein.

The system may optionally further include one or more sensors adapted and arranged to measure the pressure of an effluent gas of the absorber and an effluent gas of the regenerator or to measure the pressure differential between the two effluent gases; and a controller connected to the one or more sensors, the controller configured to receive pressure or pressure differential input measurements from the one or more sensors and to compare the pressure difference between the two effluent gases to a predetermined pressure difference value, the controller also being connected to a controllable valve adapted and arranged to adjust pressure of the effluent gas of the regenerator based on instructions received from the controller.

Still further, the system can optionally include a controller configured to receive inputs enabling determination of a quantitative impurity removal rate in the absorber and configured to compare the impurity removal rate to a predetermined control value, the controller being connected to a controllable valve adapted and arranged to adjust the flow rate of the regeneration gas fed to the regenerator based on instructions received from the controller.

BRIEF DESCRIPTION OF THE DRAWINGS

In the drawings which form a portion of the original disclosure of the invention.

DETAILED DESCRIPTION OF THE PREFERRED EMBODIMENTS

Figure 1:
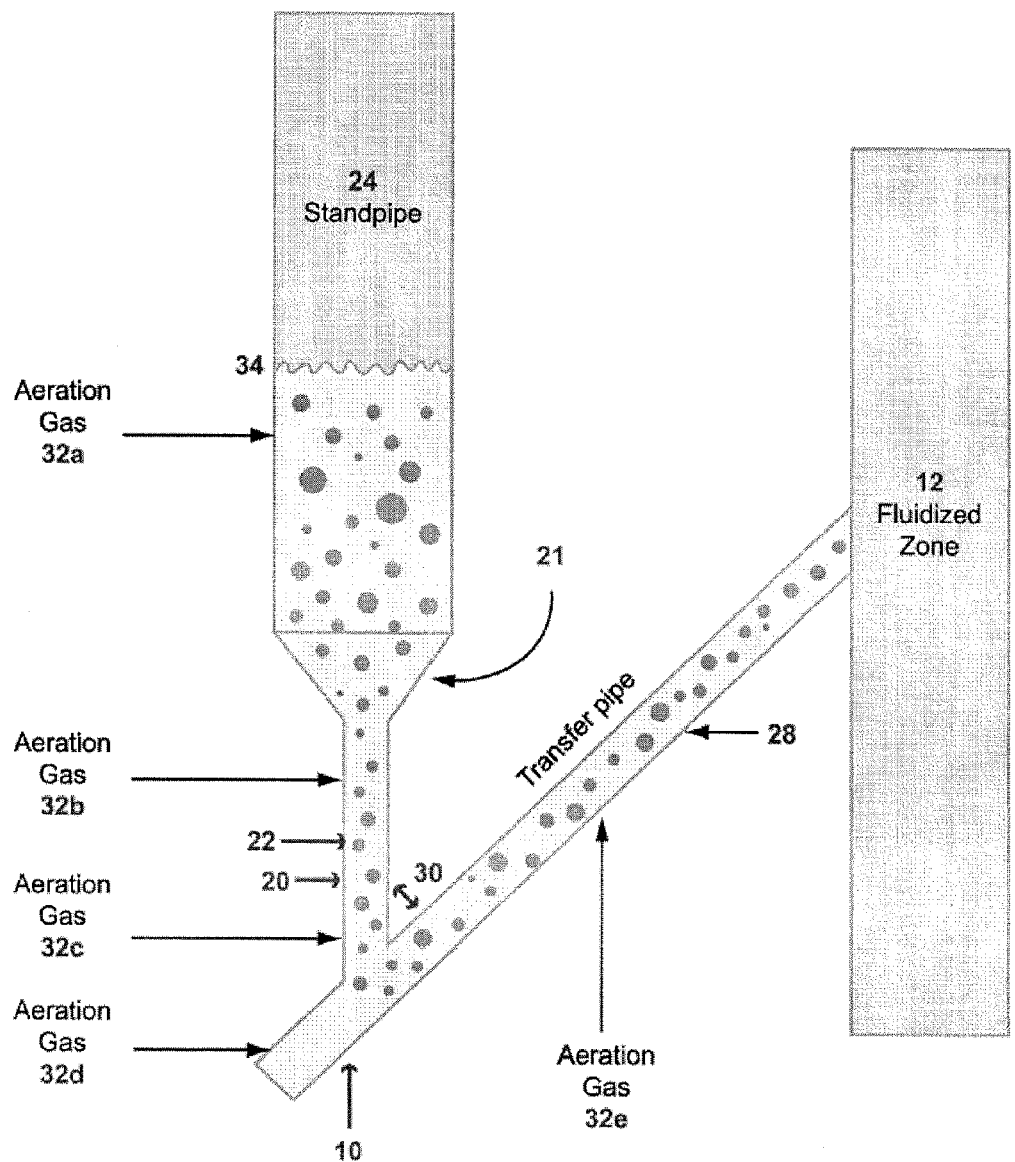
FIG. 1 is a schematic diagram of a representative J-Leg solids flow device positioned before the fluidized absorber and/or the fluidized regenerator zone and which is capable of providing a controllable solids flow rate to the connected fluidized zone.

In the following detailed description, preferred embodiments of the invention are described to enable practice of the invention. Although specific terms are used to describe and illustrate the preferred embodiments, such terms are not intended as limitations on practice of the invention. Moreover although the invention is described with reference to preferred embodiments, numerous variations and modifications of the invention will be apparent to those of skill in the art upon consideration of the foregoing together with the following detailed description.

The following definitions of some terms used herein are set forth for clarity; it being understood that such definitions are included solely for purposes of the present application and are to be applied solely to the present application.

As used herein, the term "impurity containing feed gas" is understood to mean a gas comprising one or more impurities including for example, sulfur compounds, hydrogen chloride, arsenic, selenium, hydrogen cyanide, mercury, and/or ammonia. In advantageous embodiments, the feed gas is a reducing gas such as syngas and the impurity comprises at least one sulfur compound. In one advantageous aspect, the feed gas is a reducing gas such as syngas and includes $H_2S$ and/or COS, typically both sulfur impurities in the reduced form.

As used herein, the term "sorbent" is understood to mean solid particulate materials of a fluidizable size which are capable of removing impurities from a feed gas through the mechanism of absorption, adsorption, and/or chemical reaction. It will be apparent that "sorbents" can include mixtures of particulate solids including different sorbents, other additives and the like.

As used herein, the term "fluidized absorber zone" is understood to mean a region of the process stream in which an active sorbent is fluidized or suspended in a feed gas stream containing impurities under conditions sufficient that the sorbent absorbs, adsorbs, or reacts with at least one impurity from the feed gas stream so that the sorbent exits the absorber zone with an increased impurity content and treated feed gas exits the absorber zone with a decreased impurity content.

As used herein, the term "fluidized" or "fluidization" is understood to mean an operating condition in which particulate solids are suspended in a moving gas.

As used herein, the term "fluidized regenerator zone" is understood to mean a region of the process stream in which an impurity-laden sorbent is partially or fully regenerated by contact with a regenerating gas under fluidization conditions sufficient to achieve partial or substantially complete removal of at least one impurity from the sorbent so that a sorbent exiting the fluidized regenerator zone has a reduced impurity content compared to the fluidized absorber zone. The term "regenerated sorbent" is used herein to mean sorbent, e.g., a sorbent stream, treated in the fluidized regenerator and having a reduced impurity content. The regenerating gas can comprise, for example, an oxidizing gas such as oxygen. Examples of oxidizing regenerating gases include substantially pure oxygen, and gases such as air, containing oxygen mixed with other gaseous components.

As used herein, the terms "impurity loaded sorbent" and "impurity laden sorbent" are understood to mean sorbent having an increased impurity content as a result of contact of the sorbent with a gas stream including at least one impurity selected from sulfur compounds, hydrogen chloride, arsenic and compounds thereof, selenium and compounds thereof, hydrogen cyanide and organic cyanides, and/or ammonia or derivatives thereof.

As used herein, the term "impurity content" as applied to sorbents is understood to mean the content of the sorbent derived from contact with the impurity, as it is retained by the sorbent. Typically "impurity content" as applied to sorbents refers to a chemical moiety or component derived from the impurity. Quantitative expressions of "impurity content" of sorbents and sorbent streams, unless indicated otherwise, are set forth in weight percent based on the weight of the fresh sorbent, wherein the weight of the fresh sorbent can be a calculated weight as will be apparent to the skilled artisan. For example in the case of active metal oxide sorbents used to remove $H_2S$ and COS according to the reactions:

$$H_2S + MO \rightarrow H_2O + MS \qquad (II)$$

$$COS + MO \rightarrow CO_2 + MS \qquad (III)$$

wherein M is the metal present in the sorbent, for instance Zn; MO represents a metal oxide; and MS represents a metal sulfide and sorbent weight can be calculated based on the weight of MO and the MO content of the sorbent, and impurity content can be calculated based on the weight of S (not $H_2S$ and/or COS).

As used herein, the term "solids separator" is understood to mean a device for removing solids from a fluid. An example of a solids separator may be a cyclone separator, which uses centrifugal force to remove solids from a fluid stream. Other examples include electrostatic precipitators, filters, and gravity settling chambers.

As used herein, the term "gas stripper" is understood to mean a device for displacing a gas or gas mixture from solid particles using a different gas or gas mixture. For example, a gas stripper can be used for displacing syngas from the sorbent particles using dry nitrogen, carbon dioxide or any other suitable inert gas.

As used herein, the term "bulk density" as applied to the particulate sorbent is understood to mean the mass of unfluidized sorbent divided by its volume. The volume, as will be apparent to those skilled in the art, includes the space between particulate solids as well as the space inside the pores of individual particles.

As used herein, the term "fluidized density" is understood to mean the instantaneous combined density of a mixture of fluidized solid particles and the gas used to fluidize the particles.

As used herein, the term "fluid" is understood to mean a fluid stream such as a liquid stream, a gas stream, or a gas stream comprising particulate solids such as a sorbent, wherein the particulate solids are mixed with the gas stream to enhance the flow properties of the solids particulate stream.

As used herein, the terms "impurity capacity" as applied to sorbents, and "sorbent impurity capacity" are understood to mean the maximum amount of "impurity content" that can be retained by the sorbent, expressed as a weight percent based on fresh sorbent weight (or the calculated weight of the fresh sorbent).

As used herein, the term "average particle diameter" means the volume weighted, mean particle size of a liquid dispersion of sorbent particles. The average particle diameter of the sorbent particles may be measured by laser diffraction techniques using instrumentation such as, for example, a Malvern Mastersizer 2000™, and procedures well known in the art.

As used herein, the term "holding vessel" can be, for example, a standpipe or any other vessel that is positioned and adapted to accumulate or store a portion of a particulate solids stream, and to transfer same to a zone of higher pressure as compared to the holding zone pressure.

As used herein the term "aeration gas" refers to a gas added to a particulate solids stream to modify the flow properties thereof.

The terms "packed bed flow", "packed bed region", "packed bed flow region" and "moving packed bed flow" are used interchangeably herein in accordance with the definition set forth in Wen-Chen Yang, "HANDBOOK of FLUIDIZATION and FLUID-PARTICLE SYSTEMS", Marcel Dekker, Inc, 2003, Chapter 21, pages 571-573. In particular, in the packed bed flow region, the relative gas-solids velocity ($v_r$) is less than the interstitial fluidization velocity ($v_{mf}$) of the particulate stream. More particularly, relative gas-solids velocity ($v_r$) is calculated based on the solids velocity ($v_s$) and the interstitial gas velocity ($v_g$) of the solids/gas stream according to the equation:

$$v_r = |v_s - v_g|$$

and $v_{mf}$ is defined as the $v_r$ at which the pressure drop, $\Delta P$, of the gas moving through the solids stream equals the pressure drop per unit length ($\Delta P / L_g$) of the particulate solids stream. Reference can be made to the aforementioned "HANDBOOK of FLUIDIZATION and FLUID-PARTICLE SYSTEMS" for a more detailed explanation.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Turning now to the drawings, FIG. 1 is a schematic diagram illustrating a non-mechanical gas seal forming solids transfer device, or zone, adapted for operation in the valve mode to transfer solids at a controllable flow rate. In particular, FIG. 1 illustrates a J-Leg solids transfer device, 10, adapted for operation in a valve mode, fluidly connected to and positioned upstream of a fluidized zone 12, which can be the fluidized absorber and/or the fluidized regenerator zone as discussed in greater detail subsequently.

The J-Leg 10 comprises a descending feed pipe 20 containing a fluidized stream of particulate solids 22, moving through the pipe 20 in moving packed bed flow. The feed pipe 20 is fluidly connected to a standpipe 24 which functions as an accumulator or holding vessel and delivers the stream of particulate solids 22 to feed pipe 20 via a conical restriction 21. The feed pipe 20 is fluidly connected to and discharges into an upwardly directed transfer pipe 28. The stream of particulate solids 22, moves through the transfer pipe 28 in moving packed bed flow and is delivered to the fluidized zone 12 at the discharge end of transfer pipe 28. The feed pipe 20 connects to the transfer pipe at an angle 30 of less than about 90 degrees thereby forming the characteristic J-Leg shape.

Aeration gas is added at a controllable rate to the particulate solids stream 22 moving through the feed and transfer pipes 20 and 28, respectively, of the J-Leg, at one or a plurality of locations 32a, 32b, 32c, 32d, and 32e. The aeration gas can be any of various inert gases, such as nitrogen or the like, or can be a gas having the same chemical composition as the process gas used or treated in the fluidized zone 12. The flow rate of the particulate solids stream 22 through the J-Leg can be controlled by varying the flow rate of aeration gas at one or more of the locations 32a-e. In particular, the flow of aeration gas produces a drag force on the particulates that pulls the particulate stream through the bend, i.e., angle 30, of the J-Leg. Because the drag force in the direction of solids flow increases as the flow of aeration gas increases, increasing the flow rate of the aeration gas increases the flow rate of the particulate stream 22.

The solid flow rate of particulate stream 22 can also change in response to variations in the relative pressure difference between the dense phase holding vessel or standpipe, 24, and the fluidized zone 12. An increase in the relative pressure difference between the dense phase standpipe 24 (higher pressure) and the fluidized zone 12 can result in an increase in the solids flow rate. A decrease in the relative pressure difference can result in a decrease in the solids flow rate. Nevertheless, the design and construction of the J-Leg valve mode device illustrated in FIG. 1 generally provides a relatively constant solids flow, at a flow rate determined primarily by the aeration gas flow despite minor variations in such pressure differences and the like, so long as such variations fall within predetermined parameters determined by the particular geometry, sizing, and arrangement of parts, of the J-Leg valve mode device, as will be appreciated by the skilled artisan.

The height 34 of sorbent in the holding vessel should preferably be maintained at a level sufficient to provide enough pressure head to force sorbent into the fluidized zones. The holding vessel can be sized to hold a sufficient inventory of sorbent to adequately deal with system upsets including changes in the impurity feed concentration and regenerator upsets.

Other suitable non-mechanical gas seal forming solids transfer device, or zones, adapted for operation in the valve mode to transfer solids at a controllable flow rate can also be employed in the invention (e.g., L-Leg structures and other J-Leg structures including for example, curved pipes, additional horizontal pipe elements, and the like), so long as the functions of controlling the flow of solids into the fluidized reactor system, preventing reverse flow of gases from one system to another, and controlled flow of solids leaving the system are all achieved. Examples of such other devices are set forth and discussed in the aforementioned "HANDBOOK of FLUIDIZATION and FLUID-PARTICLE SYSTEMS". In general, such devices are characterized by a reservoir or hopper feeding a downwardly directed feed pipe containing a stream of particulate solids moving through the feed pipe in moving packed bed flow; a fluidly connected horizontal or upwardly directed transfer pipe; and one or more aeration gas supply lines fluidly connected and arranged to move the particulate solids stream at a controllable flow rate through the feed and transfer pipes by applying a frictional drag force in the direction of flow of the particulate stream, to at least a portion of the particulate stream.

Figure 2:
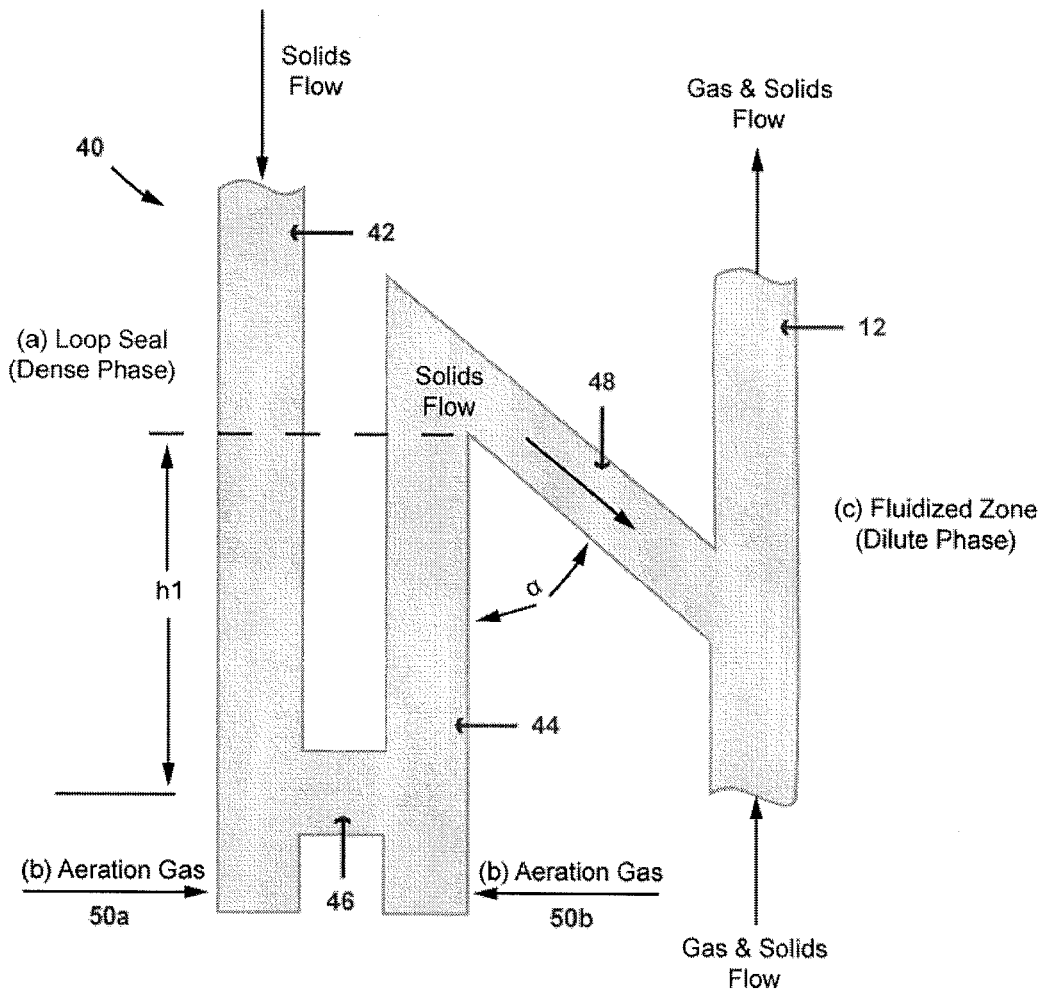
FIG. 2 is a schematic diagram of a representative loop seal solid flow device for forming a gas pressure seal between the regenerator zone and the absorber zone and for transferring the sorbent stream from the regenerator zone to the absorber zone at a solids flow rate determined by the solids flow rate of the regenerated sorbent stream.

FIG. 2 is a schematic diagram of a non-mechanical gas seal forming solids transfer zone constructed for operation in the "automatic mode" wherein solids are passed through the transfer zone at the same flow rate as the feed rate of solids into the zone. In particular, FIG. 2 illustrates a loop seal device 40 comprising a vertical downflow leg 42 fluidly connected to a vertical upflow leg 44 via a lower horizontal leg 46. A dense phase particulate solids stream admitted into the downflow leg 42 flows through the lower horizontal leg 46 and upwardly through the upflow leg 44, and is discharged via dip leg 48 into fluidized zone 12, which is advantageously the absorber zone as discussed hereinafter. The dip leg 48 connects to the vertical upflow leg 44 at an angle alpha of less than about 90 degrees. Aeration gas is admitted into the loop seal device 40 at one or more locations 50a and 50b adjacent the lower end portion of the upflow and/or downflow legs 42 and 44, respectively. The aeration gas is admitted at a constant flow rate sufficient to support a smooth and steady flow of solids through the device. The flow rate of aeration gas sufficient to achieve smooth and steady flow of solids through the loop seal can be determined by the skilled artisan according to design and test criteria known in the art and discussed, for example, in the aforementioned "HANDBOOK of FLUIDIZATION and FLUID-PARTICLE SYSTEMS". For example, in the case of Geldart Group B solids, the aeration gas flow rate must be sufficient to fluidize the upflow section 44 of the loop seal in order to establish smooth and steady flow, while little or no fluidization gas may be required to be added to the upflow leg in the case of Geldart Group A solids.

The height $h_1$ of the upflow leg 44 is fixed by the location of the dip leg 48 and angle alpha. The height of the solids stream flowing into the downflow leg 42 will automatically adjust to balance the pressure required to move solids upwardly through the height $h_1$ of the upflow leg 44. The height of the vertical flow of solids through the legs of the loop seal, in combination with the fluid characteristics of the particulate solids provides a pressure seal capable of insulating operation of the loop seal from minor fluctuations in pressures across the loop seal 40, and also prevents large pressure variations from blowing the pressure seal established by the vertical legs 42 and 44 of the loop seal 40. The design of the loop seal 40, and particularly the height $h_1$ can be selected by the skilled artisan to accomplish seals of predetermined pressures according to design and test criteria known in the art and discussed, for example, in the aforementioned "HANDBOOK of FLUIDIZATION and FLUID-PARTICLE SYSTEMS".

As indicated previously, the design and construction of the loop seal solids transfer device 40 provides an "automatic mode" solids transfer in that the flow rate of solids through the loop seal automatically adjusts so that solids are passed through the loop seal 40 at the same flow rate as the feed rate of solids into the zone. In particular, the height of the solids stream flowing into the downflow leg 42 will automatically adjust to balance the pressure required to move solids upwardly through the height $h_1$ of the vertical upflow leg 44. Thus the flow rate of the solids stream flowing into the vertical downflow leg 42 automatically establishes the same flow rate of solids through the vertical upflow leg 44 so that a balance in pressure is maintained between the two vertical legs.

Various different types and constructions of non-mechanical gas seal forming solids transfer zones are known to the skilled artisan and can be substituted for the loops seal device 40 illustrated in FIG. 2. Such devices include seal-pot, N-Valve, V-Valve, L-Valve constructions, and the like, discussed for example in the aforementioned "HANDBOOK of FLUIDIZATION and FLUID-PARTICLE SYSTEMS".

Figure 3:
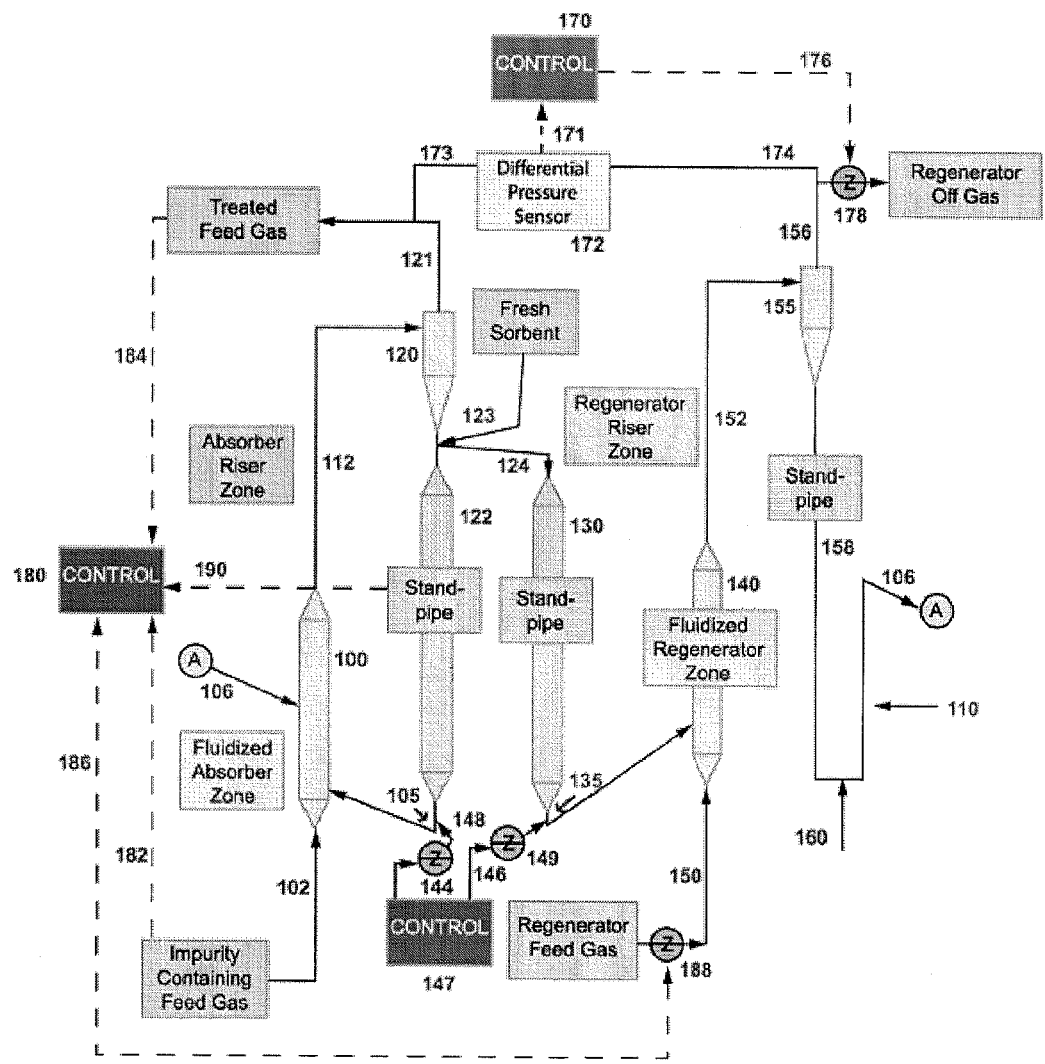
FIG. 3 is a schematic diagram of one embodiment of a dual loop process and apparatus for removing impurities from a gas according to the invention wherein a portion of the impurity laden solid sorbent stream recovered from the absorber is recycled to the absorber, and another portion of the impurity laden solid sorbent stream is passed to a regenerator zone, and illustrates the use of holding zones, in the form of standpipes, in each of the absorber and regenerator loops or zones, to assist distribution and flow of particulate solid sorbent through and between the loops.

FIG. 3 is a schematic diagram of one embodiment of a dual loop process and apparatus for removing impurities from a gas according to the invention. An impurity containing feed gas is admitted into a fluidized absorber 100 via feed gas line 102. The feed gas is contacted in the absorber 100 with a stream of recycled sorbent admitted to the absorber 100 via J-Leg 105 and with a stream of regenerated sorbent which is admitted to the absorber 100 via a dip leg line 106 which, in turn, is fluidly connected to a upstream loop seal device 110. The feed gas is treated in the absorber 100 and a fluidized stream comprising treated feed gas and impurity loaded sorbent is recovered from the absorber via line 112 which is fed to solids separator 120. Treated feed gas having reduced impurity content is recovered from the solids separator 120 via line 121.

Impurity loaded solid sorbent is recovered from the solids separator 120 and a portion thereof is passed to standpipe 122, while another portion is passed via a dip leg 124 to a second standpipe 130. Fresh sorbent can be added to the recycle standpipe 122 via a supply line 123. The impurity loaded sorbent in standpipe 122 is recycled via J-Leg 105 to the absorber 100, while impurity loaded sorbent in standpipe 130 is fed via a second J-Leg 135 to the fluidized regenerator zone 140. The J-Leg solids transfer devices 105 and 135 are fluidly connected to controllable aeration gas supply lines, 144 and 146, respectively, which control the feed rate of solids through the J-Leg transfer devices 105 and 135. Control of the aeration gas supplied to each of the J-Leg solids transfer devices can be conducted by any of various control devices, 147, which are connected to controllable valves 148 and 149 associated with the aeration gas feed lines 144 and 146, respectively. The J-Leg transfer devices 105 and 135 are thus operated in the valve mode as discussed in connection with FIG. 1 previously.

The impurity loaded sorbent which is fed via J-Leg 135 to the regenerator zone 140 is contacted in the regenerator zone 140 with regenerator feed gas admitted to the regenerator zone via line 150. A fluidized effluent stream is recovered from the regenerator zone 140 and passed to a solids separator 155 for separation into a regenerator off gas which is recovered via line 156 and passed to an appropriate downstream cleanup zone (not shown). A regenerated solid sorbent stream is recovered from the solids separator 155 and is passed into the downflow leg 158 of loop seal solids transfer device 110, which in turn, transfers the regenerated sorbent to the absorber 100 via dip leg 106 as indicated previously. An aeration gas supply line 160 is fluidly connected to a lower portion of loop seal solids transfer device 110 to aid in establishing a smooth flow of solids through the loop seal as discussed in connection with FIG. 2, previously.

One advantageous process control 170 for controlling the flow of solid sorbent streams in and between the absorber and regenerator loops is illustrated in FIG. 3. Control 170 is connected via control input 171 to a differential pressure sensor 172 which in turn is connected via sample gas lines 173 and 174, to the respective effluent gas lines 121 of the absorber 100 and 156 of the regenerator 140. In addition, control 170 is operatively connected via a control output 176, with a controllable valve 178 which is operatively connected to regenerator off gas line 156. The differential pressure sensor 172 outputs to control 170, a control input (171) representative of the pressure difference between the absorber and regenerator pressures. Control 170 compares the pressure differential information received from the differential pressure sensor 172 with a control set point representative of a predetermined pressure difference in-range value for stable system operation. If the actual pressure difference value differs from the control set point, control 170 sends instructions to controllable valve 178 via a control output 176, for adjustment of the valve to thereby change the pressure in the regenerator 140, and in turn, the pressure difference between the absorber and regenerator with the specific objective of achieving the desired pressure differential in-range value between the absorber and regenerator.

In an alternative embodiment (not shown), a first pressure sensor operatively associated with the absorber effluent line 121 and a second pressure sensor operatively associated with the regenerator effluent gas line 156 are used to collect data representative of the gas pressures within the effluent gas lines 121 and 156, of the absorber 100 and the regenerator 140, respectively. Signals representative of the pressures in the absorber 100 and the regenerator 140 are sent from the first and second pressure sensors to the control 170, which then compares these signals to determine a calculated pressure difference value representative of the pressure difference between the absorber 100 and the regenerator 140. In the same manner as discussed above, the calculated pressure difference is then compared to a set point representative of a predetermined pressure difference in-range value for stable system operation. If the calculated pressure difference value differs from the control set point, control 170 sends instructions to controllable valve 178 via a control output 176, for adjustment of the valve to thereby change the pressure in the regenerator 140, and in turn, the pressure difference between the absorber and regenerator with the specific objective of establishing the desired pressure differential set point between the absorber and regenerator.

In one advantageous embodiment, the predetermined pressure difference in-range value comprises a pressure difference in the range of between about 1 psig and about 20 psig. In another advantageous embodiment, the predetermined pressure difference in-range value comprises a pressure difference in the range of between about 2 psig and about 10 psig. The pressure difference in-range control value can be a single value, a range of values, or a control algorithm for sending different instructions to the controllable valve 178 depending on factors such as the quantitative difference between the calculated pressure difference and one or more predetermined pressure difference set points, the temperature in the absorber and/or regenerator, the rate at which the calculated pressure difference is moving towards or away from one or more predetermined pressure difference set points, and the like, as will be apparent to those of ordinary skill in the art.

It will also be apparent to the skilled artisan that pressure adjustments to maintain the pressure difference between the absorber and the regenerator within a predetermined pressure difference in-range value can be effected by adjusting the pressure of the absorber instead of the regenerator pressure, or by adjusting the pressure of both, and that pressure adjustments can be made to the absorber and/or regenerator gas influent lines if desired.

The control of the pressure difference between the absorber and the regenerator as discussed in connection with control 170, is particularly effective for controlling the sorbent solids flow rates between and through the absorber and regenerator when used in combination with valve mode and automatic mode non-mechanical solids transfer devices as illustrated in FIG. 3. Nevertheless, the control process can alternatively be used with substantial benefits and advantages with controllable mechanical valves, as will be apparent to the skilled artisan. Moreover, the use of a valve mode non-mechanical solids transfer device arranged to feed the regenerator 140, such as J-Leg 135, in combination with an automatic mode non-mechanical solids transfer device arranged to receive regenerated sorbent from the regenerator and feed same to the absorber 100, such as loop seal 110, can provide significant benefits and advantages with or without use of the valve mode non-mechanical solids transfer device arranged to feed recycled sorbent to the absorber 100, i.e., J-Leg 105 illustrated in FIG. 3.

One advantageous process control 180 for maintaining a balance between the impurity removal rate in the absorber and the impurity removal rate in the regenerator is also illustrated in FIG. 3. Control 180 is connected via control inputs 182 and 184, to impurity analyzers (not shown) associated with the absorber influent feed gas, and effluent treated gas lines, 102 and 121, respectively. In addition, control 180 is operatively connected, via control inputs/output 186, with a controllable valve 188 which is operatively connected to regenerator feed gas line 150. Enhanced process control according to this aspect of the invention comprises a feed forward process control wherein the impurity removal rate in the absorber is calculated by comparing the impurity content values fed to control 180 from the impurity analyzer inputs 182 and 184. The impurity removal rate in the absorber is then compared to the impurity removal rate in the regenerator which may be calculated from input received via control input/output 186. Alternatively the calculated impurity removal rate in the regenerator can be calculated from measurements representative of impurity content of the regenerator off gas, obtained via sensors and control connections not shown.

If the calculated impurity removal rates in the absorber and regenerator differ from a predetermined in-range stoichiometric control value, the control 180 sends instructions to controllable valve 188 via a control output 186, for adjustment of the valve 188 to thereby change the feed rate of active regenerator feed gas to the regenerator which in turn changes the impurity removal rate in the regenerator 140.

The term "active regenerator feed gas" refers to the content of the regenerator feed gas which is capable of interacting (typically by chemical reaction) with the sorbent under conditions present in the regenerator to reduce the impurity loading of the sorbent. It is to be noted that the content of the active regenerator feed gas in the regenerator feed gas can be changed. Changing the content of the active regenerator feed gas in regenerator feed gas will affect the rate and amount of regeneration accomplished. For example when regeneration of the sorbent is accomplished by contact with an oxidation regeneration gas, the regenerator feed gas can be air with a fixed oxygen content, air and inert gas mixtures or oxygen and inert gas mixtures.

In those cases, in which the regenerator feed gas contains a fixed content of active regenerator feed gas (i.e., air with 21 mole % oxygen) and is admitted to the regenerator 140 via line 150, the adjustment of controllable valve 188 according to the instructions sent by control 180 will result in a change of the flow rate of the regenerator feed gas in line 150. On the other hand, in those cases where the content of the active regenerator feed gas can be changed in the regenerator feed gas (i.e., air and inert mixtures or oxygen and inert mixtures) is admitted to the regenerator 140 via line 150, valve 180 can effect a change in the feed rate of active regenerator feed gas fed to the regenerator 140 by changing the relative content (i.e., % content, mol % content, etc.) of active regeneration gas in the regeneration feed gas admitted to line 150 without changing the overall flow rate of the regenerator feed gas in line 150. Alternatively, valve 180 can effect a change in the feed rate of active regenerator feed gas fed to the regenerator 140 by changing the overall flow rate of the regenerator feed gas in line 150 when no change is made in the relative content of active regeneration gas in the regeneration feed gas. In summary, the feed rate of active regenerator feed gas to the regenerator can be changed by changing the content of active regenerator feed gas present in the regenerator feed gas, or by increasing or decreasing the flow rate of the regenerator feed gas without changing its content, or by changing both the composition and the overall flow rate of the regenerator feed gas admitted to the regenerator zone via line 150.

The predetermined in-range stoichiometric control value is based at least in part on the material balance between the impurity removal rate in the absorber and the impurity removal rate in the regenerator. In some cases the predetermined in-range stoichiometric control value will be calculated to maintain an even material balance between the impurity removal in the absorber and regenerator. However, in additional advantageous embodiments of the invention, the predetermined in-range stoichiometric control value is calculated to provide less than, or greater than, an even material balance between the impurity removal in the absorber and regenerator in order to achieve various desirable process functions such as, for example, decreasing, or increasing, the average impurity loading of the sorbent.

In particular, control 180 can be programmed to receive at least one impurity loading input signal 190 containing information directly or indirectly representative of the impurity loading of the impurity loaded sorbent removed from the absorber via line 112. The impurity loading input signal 190 is compared to a predetermined in-range sorbent impurity loading value to determine whether the predetermined in-range stoichiometric control value, discussed above, should be adjusted to provide less than, or greater than, an even material balance between the impurity removal in the absorber and in the regenerator in order to decrease, or increase, the average impurity loading of the sorbent. For example, if the impurity loading input signal 190 indicates that the sorbent has less than a desired minimal average impurity loading, the predetermined in-range stoichiometric control value can be adjusted to increase the impurity loading of the sorbent. If the impurity loading input signal 190 indicates that the sorbent has greater than a desired maximum average impurity loading, the predetermined in-range stoichiometric control value can be adjusted to decrease the impurity loading of the sorbent. Similarly, if the impurity loading input signal 190 indicates that the average impurity loading of the sorbent is within a predetermined desirable range, but is increasing or decreasing, the predetermined in-range stoichiometric control value can be adjusted as necessary to maintain a relatively constant average impurity loading of the sorbent.

Information directly representative of the impurity loading of the sorbent can comprise analytical information obtained by analysis of at least one impurity loaded sorbent grab sample recovered from the absorber, or obtained by in-line analysis of all or a portion of the impurity loaded sorbent stream removed from the absorber. Alternatively, information directly representative of the impurity loading of the sorbent can be obtained by exposing batch or side stream samples of impurity loaded sorbent to a concentrated or essentially pure impurity gas stream under absorption conditions ensuring saturation of the sorbent's remaining impurity removal capacity whereby the quantity of impurity removed from the impurity gas stream can allow calculation of the remaining impurity removal capacity of the sorbent. Information indirectly representative of the impurity loading of the sorbent can comprise on-line measurements of variations in the reaction conditions in the absorber and/or regenerator which, in combination with the impurity removal rate information calculated from impurity analyzer inputs 182 and 184, can be used to determine if the impurity removal capacity of the sorbent is at, or close to, full capacity. Measurements of impurity content of the regenerator off gas and/or measurements of variations of the reaction conditions in the regenerator can also be used to provide information indirectly representative of the impurity loading of the sorbent.

Figure 4:
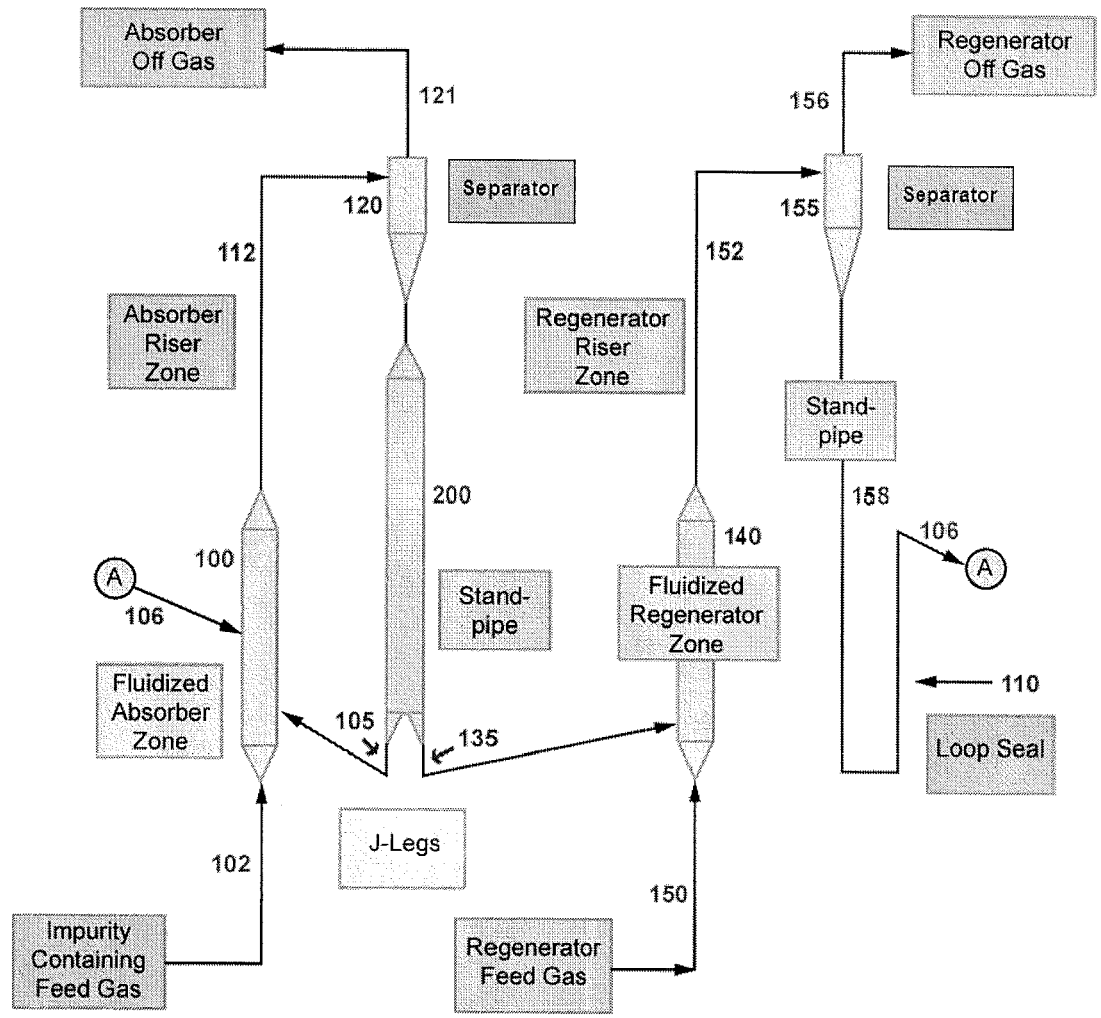
FIG. 4 is a schematic diagram of another embodiment of a dual loop process and apparatus for removing impurities from a gas according to the invention wherein a single, shared standpipe is used to feed impurity loaded sorbent to both the fluidized absorber zone and the fluidized regenerator zone.

FIG. 4 is a schematic diagram of another embodiment of a system and process for removing impurities from a gas where a single, shared standpipe 200 is used to feed impurity loaded sorbent to both the fluidized absorber zone and the fluidized regenerator zone. The various controls, valves and the like discussed in connection with FIG. 3 are advantageously included in the system and process of FIG. 4, but are not specifically shown.

Figure 5:
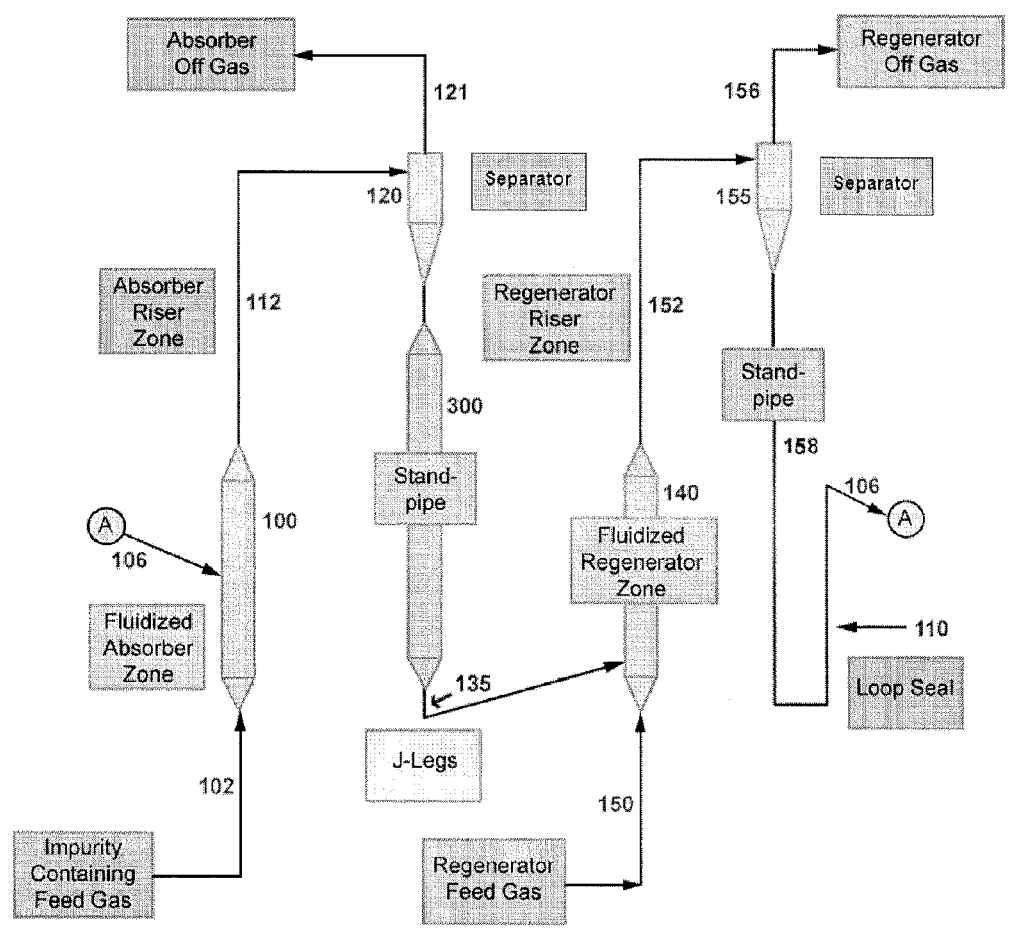
FIG. 5 is a schematic diagram of another embodiment of a system and process for removing impurities from a gas where impurity loaded sorbent is not recycled to the fluidized absorber zone.

FIG. 5 is a schematic diagram of another embodiment of a system and process for removing impurities from a gas similar to the processes and systems of FIGS. 3 and 4, where impurity loaded sorbent recovered from the absorber is not recycled to the fluidized absorber zone. Instead, as shown in FIG. 5, all of the impurity loaded sorbent recovered from the absorber is passed to a single standpipe 300 and is then transferred to the fluidized regenerator 140 via J-Leg 135. The various controls, valves and the like discussed in connection with FIG. 3 are advantageously included in the system and process of FIG. 4, but are not specifically shown.

As indicated previously, in various advantageous embodiments, the processes, systems and apparatus of the invention can be used for removal of any of various impurities from a feed gas including sulfur compounds, hydrogen chloride, arsenic, selenium, hydrogen cyanide, and/or ammonia. Nevertheless, the invention is currently believed to be particularly advantageous when used for reducing the content of at least one sulfur impurity in a reducing gas. Desirably, the invention can be employed for the reduction of at least one sulfur impurity comprising $H_2S$ and/or COS from a reducing gas of carbonaceous origin.

The invention is applicable to a wide variety of feed gases, including a wide variety of syngas compositions having sulfur impurity levels ranging from about 100 to about 40,000 ppmv, advantageously from about 1000 to about 15,000 ppmv, or in alternative advantageous embodiments, sulfur impurity levels ranging from about 5000 to about 10,000 ppmv. The processes and apparatus of the invention can be applied to various sulfur contaminated feed gas streams to achieve sulfur impurity levels of 100 ppmv or less, advantageously 50 ppmv or less in the purified treated gas stream exiting the absorber. Where desirable, the invention can be used to reduce sulfur impurity content from an initial level exceeding 5000 ppmv to a final level of about 30 ppmv or less, e.g., about 20 ppmv or less, or 10 ppmv or less.

In advantageous embodiments of the invention, the fluidized absorber zone is maintained at a temperature in the range of between about 600° F. and about 1200° F. and a pressure of between about atmospheric pressure and about 1200 psig, and the regenerating zone is maintained at a temperature in the range of between about 900° F. to about 1450° F. and about the same pressure as the absorber. In yet further advantageous embodiments of the invention, the fluidized absorber zone is maintained at a temperature in the range of between about 700° F. and about 1000° F. and a pressure of between about 100 psig and about 1200 psig (e.g., between about 200 psig and about 1000 psig), and the regenerating zone is maintained at a temperature in the range of between about 1200° F. and about 1450° F. and a pressure which is the same or about the same as the absorber pressure.

In one embodiment, impurity containing feed gas is introduced into the base of a fluidized absorber zone, as shown in FIGS. 3-5, where it is mixed with a sorbent. The superficial velocity of the impurity containing feed gas stream may be maintained above the minimum fluidization point (dependant on operating pressure and temperature) and, generally, within a range from 2 to 5 ft/sec (0.6 to 1.5 m/sec), though other suitable velocities may be chosen.

In one embodiment of the present invention, impurity-containing feed gas may be mixed with an active metal oxide sorbent. The sorbent contacted with the impurity containing feed gas in the fluidized absorber zone may comprise one or more active metal oxides chosen from iron oxide, zinc oxide, zinc ferrite, zinc titanate, copper ferrite, copper oxide, vanadium oxide, and mixtures thereof. Desirable active metal oxide containing sorbent compositions and processes for sulfur removal are disclosed in U.S. Pat. No. 6,951,635 B2 issued Oct. 4, 2005 to Gangwal et al; U.S. Pat. No. 6,306,793 B1 issued Oct. 23, 2001 to Turk et al; U.S. Pat. No. 5,972,835 issued Oct. 26, 1999 to Gupta; U.S. Pat. No. 5,914,288 issued Jun. 22, 1999 to Turk et al; and U.S. Pat. No. 5,714,431 issued Feb. 3, 1988 to Gupta et al.

In another embodiment, before contacting the sorbent with the impurity containing feed gas in the fluidized absorber zone, the bulk density of the sorbent can range from 60 to 110 lb/ft$^3$ (0.96 to 1.76 g/cm$^3$) and can have an average particle diameter from 50 to 140 microns.

In still another embodiment, and depending on other process parameters, for instance, the inlet impurity concentration and the temperature of the fluidized absorber zone, the fluidized absorber zone may optionally have a back-mixed zone to increase the total gas-solid contact time. If long contact times are not desired, the fluidized absorber zone may be entrained flow. Regenerated sorbent is returned from the regenerator system to the fluidized absorber zone where it assists in removing impurities from the gas and transfers heat from the sorbent to the purified gas, thus improving the thermal efficiency of the integrated system. A suitable residence time in the fluidized absorber zone ranges from 3 to 25 seconds, and in another embodiment from 3 to 10 seconds.

In one embodiment of the present invention, at steady state conditions, the average impurity content of the impurity loaded sorbent exiting the absorber ranges from 10% to 90% of the sorbent impurity capacity, for example from 30 to 75% of the sorbent impurity capacity.

When the feed gas stream comprises arsenic, the arsenic content of the loaded sorbent increases at a rate proportional to the amount of gas that has contacted the sorbent. The arsenic content, for example, of the arsenic loaded sorbent may be at least 0-3000 ppm as it exits the fluidized absorber zone.

When the feed gas stream comprises selenium, the selenium content of the loaded sorbent increases at a rate proportional to the amount of gas that has contacted the sorbent. The selenium content, for example, of the selenium loaded sorbent may be at least 0-500 ppm as it exits the fluidized absorber zone.

The impurity loaded sorbent recovered from the absorber can be treated to enhance removal of retained feed gas prior to recycling of the sorbent, and/or prior to treatment of the sorbent in the regenerator. Thus, for example, sorbent recovered from solids separator 120 in FIG. 3, in one embodiment of the invention, can be passed through a gas stripper. The gas stripper uses an inert gas, such as nitrogen, steam, carbon dioxide, or the like, flowing countercurrent to the sorbent flow to displace synthesis gas from the void spaces between sorbent particles, thus minimizing gas losses to the fluidized regenerator zone.

In at least one embodiment of the present invention, the absorber system comprises an optional holding vessel, for instance a standpipe (e.g., standpipes 122 and 130 in FIG. 3), which serves as the primary holder of sorbent inventory and will normally operate in a dense phase mode. For instance, the effective density of the separated impurity loaded sorbent in the holding vessel is greater than or equal to 50 lb/ft$^3$ (0.80 g/cm$^3$). The majority of the separated impurity loaded sorbent, for example the partially metal sulfided sorbent, continues to the bottom of the optional holding vessel where it is returned to the fluidized absorber zone.

In one embodiment, the treated feed gas (absorber off-gas) having a reduced impurity content exits the top of the absorber via a solids separator, for example, a cyclone separator. After exiting the solids separator, the absorber off-gas may also be passed through a filter to remove any fine solid particles not captured by the solids separator. Acceptable filter media must be capable of withstanding the high temperature and potentially corrosive nature of the absorber off-gas. Specifically, Dynalloy™ D215-160 was shown to be an acceptable filter media for the absorber off-gas derived from syngas comprising sulfur and arsenic impurities. The acceptable filter media may be different for different feed gas and off-gas streams and can be identified by various testing regimes, such as, for example, by exposing samples (or coupons) of various filter media to simulated off-gas compositions at temperatures and pressures simulating use, or long term use, of the filter media under actual process conditions, followed by testing to identify any resultant changes in the physical properties, composition and/or crystalline structure, etc., of the sample.

The solids captured by the filter are transferred to a separate pressure vessel (lockhopper) that can be isolated from the filter without affecting filter operation or gas flow. Once isolated, the lockhopper pressure is reduced to a safe level and the solids are discharged. Once the discharge is complete, the lockhopper is sealed and pressurized with gas (inert or process gas) and then opened back up to the filter.

The impurity-containing feed gas may or may not contain water vapor. By use of a feed gas heat exchanger, the temperature of the fluidized absorber zone may be controlled between 600 and 1200° F., for instance ranging from 700 to 1000° F. The pressure of the impurity containing feed gas can be controlled between atmospheric pressure and 1200 psig by using, for instance, a throttling control valve located in the effluent gas flow path, usually downstream of the filter or scrubber. The effective sorbent density in the fluidized absorber zone can range from 5 to 50 lb/ft$^3$ (0.08 to 0.80 g/cm$^3$) by adjusting the sorbent flow from the optional holding vessel and/or the process gas flow.

A suitable density to achieve impurity removal can depend on 1) the inlet gas impurity concentration; 2) the impurity concentration on the sorbent, for instance the metallic oxide sorbent; 3) temperature of the fluidized absorber zone; and 4) water vapor content. Inert gas, such as nitrogen, steam, or carbon dioxide, may be used to aid in achieving the velocity required for solids transport and/or to aid in partially fluidizing the sorbent in the holding vessels, for example standpipes.

The average impurity content of the sorbent may be controlled by diverting a portion of impurity loaded sorbent, or alternatively all the impurity loaded sorbent, from the absorber system to the regenerator system where the metal oxide is recovered. Impurity loaded sorbent transported to the fluidized regenerator zone may enter an optional holding vessel before being regenerated. If that occurs, the impurity loaded sorbent may be maintained in dense phase mode in the holding vessel. The density of the transported impurity loaded sorbent in the holding vessel is greater than or equal to 50 lb/ft$^3$. The impurity loaded sorbent is then fed into the fluidized regenerator zone.

As disclosed herein, the descending pipe of the J-Leg shown in FIG. 1, which is positioned before the fluidized absorber zone and/or the fluidized regenerator zone, may comprise, for instance, a flow restrictor chosen from a conical or eccentric reducer and a flat plate or disk with at least one fixed orifice. Other suitable J-Leg structures can be utilized. Such J-Leg structures should control the flow rate of fluid material transferred from, for example, a dense-phase holding vessel into a dilute-phase fluidized zone.

The transfer pipe of the J-Leg, such as shown in FIG. 1, may be positioned before the fluidized absorber zone and/or the fluidized regenerator zone. The diameter of the transfer pipe is equal to or less than the diameter of the holding vessel. The transfer pipe transfers the material from the descending pipe to the gas-solid fluidized zone. The transfer pipe may employ, for example, a change in flow direction of more than 90° such that a seal or trap of solid material is formed to prevent reverse flow of gas through the J-Leg. The elevation gained by the transfer pipe may be, for instance, designed based on the material density and the relative pressure of two sides of the system such that it is sufficient to withstand any process upsets without emptying of solids.

The transported impurity loaded sorbent is contacted with regenerator gas in the fluidized regenerator zone. When oxidative regeneration is required, air can be fed into the fluidized regenerator zone to provide oxygen for the regeneration reaction and to provide adequate fluidization velocity over a nominal range of operating conditions. To provide for a greater operating range, it is possible to blend an inert gas (comprising, for example, nitrogen, steam, and carbon dioxide) and oxygen to create oxygen mixtures from 2% to 50%. The amount of oxygen can be controlled such that the rate of impurity removal from the sorbent in the fluidized regenerator zone equals the rate of impurities deposited on the sorbent in the fluidized absorber zone. The concentration of oxygen in the regenerator off-gas is preferably maintained at very low levels and can be periodically or continuously measured and compared to a predetermined set point to provide a process control indicator of proper stoichiometry.

Fluidization conditions in the fluidized regenerator zone may, for example, be maintained to provide adequate backmixing of the hot sorbent with the cooler sorbent entering the fluidized regenerator zone to sustain the temperature in the fluidized zone from 900° F. to 1450° F., for instance from 1200 to 1450° F. These operating temperature windows ensure that operating conditions minimize formation of sulfate during oxidative regeneration according to the following reactions:

$$MO + SO_2 + 0.5\, O_2 \leftrightarrow MSO_4 \qquad (IV)$$

$$MS + 2O_2 \leftrightarrow MSO_4 \qquad (V)$$

wherein M is the metal present in the sorbent, for instance Zn; MO represents a metal oxide; MS represents a metal sulfide, and MSO$_4$ represents a metal sulfate.

The regenerator temperature may be maintained by a combination of any of the following: 1) adjusting the feed of cooler sorbent from the second holding vessel to mix with the hotter sorbent in the fluidized regenerator zone; 2) adjusting the temperature of the sorbent via heaters prior to entering the fluidized regenerator zone; 3) the co-combustion of a supplementary fuel such as syngas, natural gas, propane, diesel, or other flammable material whose flow can be adequately controlled and will combust under normal regenerator conditions; and 4) adjusting the temperature of the oxidant gas prior to entering the fluidized regenerator zone.

To aid in maintaining the appropriate reaction temperature in the regenerator, the impurity loaded sorbent density in the fluidized regenerator zone can be adjusted to a density in the range of from 5 to 60 lb/ft$^3$, such as from 10 to 40 lb/ft$^3$ (0.16 to 0.64 g/cm$^3$), and the reactor portion of the regenerator can be designed to achieve operation in a back-mixed mode. An acceptable residence time in the fluidized regenerator zone can range from 3 to 25 seconds, such as from 3 to 10 seconds.

Upon leaving the regenerator back-mixed zone, the superficial velocity of the regenerated sorbent stream can be increased by reducing the cross-sectional area of the riser and/or by the addition of an inert gas to the sorbent stream. The increased gas velocity transports the regenerated sorbent, for instance regenerated metallic oxide sorbent, up the fluidized regenerator zone toward a solids separator. Prior to entering the solids separator, the gas velocity may be again be altered in order to provide improve separation in the solids separator. For example, the gas velocity may be further increased to effect better separation in a cyclone separator.

In one embodiment of the present invention, the solids separator may be a cyclone separator wherein a majority of the regenerated sorbent is separated from the regenerator off-gas. For instance, 90 to 99% of the regenerated sorbent may be separated from the regenerator off-gas.

The regenerator off-gas exits the top of the solids separator, for example, a cyclone separator. After exiting the cyclone separator, the regenerator off-gas may also pass through a filter to remove any fine solid particles not captured by the cyclone separator. Acceptable filter media must be capable of withstanding the high temperature and potentially corrosive nature of the regenerator off-gas. Specifically, Alloy 59 (also know as Alloy HR or DIN No. 2.4605) or Dynalloy™ D215-160 were shown to be suitable filter media for embodiments of the invention described in the working examples set forth hereinafter. As with the acceptable filter media that can be used downstream of the absorber for solids separation, discussed previously, acceptable filter media may be different depending on the sorbent composition, impurity composition, impurity loading, regeneration gas composition and/or the specific temperature and pressure conditions in, or following the regenerator zone. Acceptable filter media can be identified by various testing regimes discussed previously in connection with filter media used downstream of the absorber.

The solids captured by the filter are transferred to a separate pressure vessel (lockhopper) that can be isolated from the filter without affecting filter operation or gas flow. Once isolated, the lockhopper pressure is reduced to a safe level and the solids are discharged. Once the discharge is complete, the lockhopper is sealed and pressurized with gas (inert or process gas) and then opened back up to the filter.

The pressure of the regenerator system may be controlled by use of a throttling valve in the regenerator off-gas flow path downstream of the particulate filter. Sulfur dioxide levels in the regenerator off-gas stream range from 1 to 33% volume depending on oxygen feed concentration.

The regenerated sorbent leaves the bottom of the solids separator and passes optionally through a gas stripper. The gas stripper uses an inert gas, for instance, nitrogen, steam, and carbon dioxide, flowing countercurrent to the sorbent flow to displace regenerator off-gas from sorbent particles, thus minimizing transfer of sulfur dioxide to the absorber.

In the event that the feed gas comprises solid particles, the particle size distribution within the invention may be effectively maintained by passing the feed gas through solids separators with similar efficiency to that used in the absorber and regenerator systems. Particulate matter present in the feed gas will either be removed by the pretreatment separator or passed through the system without accumulation.

On paths that have infrequent, intermittent sorbent flow, for instance sample lines and charging lines, if steam is allowed to condense around stagnant sorbent, plugs will form. These plugs can be prevented by a combination of adequate heat tracing, insulation, and/or dry gas purges, such as for example inert gases or dry syngas to prevent water condensation.

Adequate provision may be incorporated, for instance, into the design to allow for charging and discharging of sorbent while at operating conditions, similar to Fluid Catalytic Cracker (FCC) systems. These systems can be designed to operate at pressures in excess of 1200 psig in accordance with the disclosures made herein.

Prior to charging sorbent, the system may be, for example, purged of condensable gas with a dry inert gas. After establishing appropriate aeration and transport gas flows, sorbent is charged to the system and circulated. Solids circulation helps ensure uniform heat distribution. The system then can be heated to a temperature greater than the dew point of the process gas prior to its introduction. Preheating the system also minimizes the potential for equipment damage due to thermal shock or dew point corrosion. At least one method of achieving this objective incorporates the use of a startup heater, a recirculation compressor and a dry, inert gas, for example nitrogen. Use of a single such system will allow the absorber and regenerator to be simultaneously pre-heated.

Once the system is pre-heated, the impurity containing gas is introduced to the absorber. Circulation is maintained in the regenerator using the dry inert gas system described previously until sufficient amount of impurities have has been loaded on the sorbent to initiate the regeneration reaction.

The initial minimum regeneration reaction temperature of 1000° F. in the fluidized regenerator zone may be obtained by at least one of the following methods: 1) addition of a pyrophoric additive, such as iron sulfide or similar material, that will spontaneously combust when exposed to oxygen and have sufficient heat of combustion to raise the temperature of the fluidized regeneration zone high enough to support regeneration reaction; 2) addition of a supplementary fuel, such as syngas, natural gas, propane, diesel, or other flammable material, whose flow can be adequately controlled and will combust under normal regenerator conditions; and 3) continued application of the dry gas preheating system with an adequately designed startup heater. Where supplementary fuel is utilized, the fuel may be added directly to the fluidized regeneration zone or it may be mixed with the oxygen and combusted prior to entering the fluidized regenerator zone. In either case, the hot combustion gases are used to raise the temperature of the fluidized regenerator zone to the minimum temperature required for the regeneration reaction. Once this temperature is reached, the flow of supplementary fuel may be stopped or scaled back as needed to assist in maintaining the fluidized regenerator reaction zone above the minimum reaction temperature. Persons skilled in the art would understand other methods and techniques to achieve the minimum reaction temperature in the fluidized regeneration zone.

To minimize the potential for sorbent agglomeration, condensable vapors can be purged from the system with dry inert gas. This purging may be performed while the system is cooling down. The above mentioned startup circulation system is also designed to allow controlled cooling of the system while purging condensables.

The following examples are intended to illustrate the invention in a non-limiting manner. The term "standard" is used throughout these examples to provide reference conditions of 70° F. (21° C.) and atmospheric pressure to establish gas volumes and gas volumetric flow rates.

EXAMPLES

Example 1

Sulfur Removal

Figure 6:
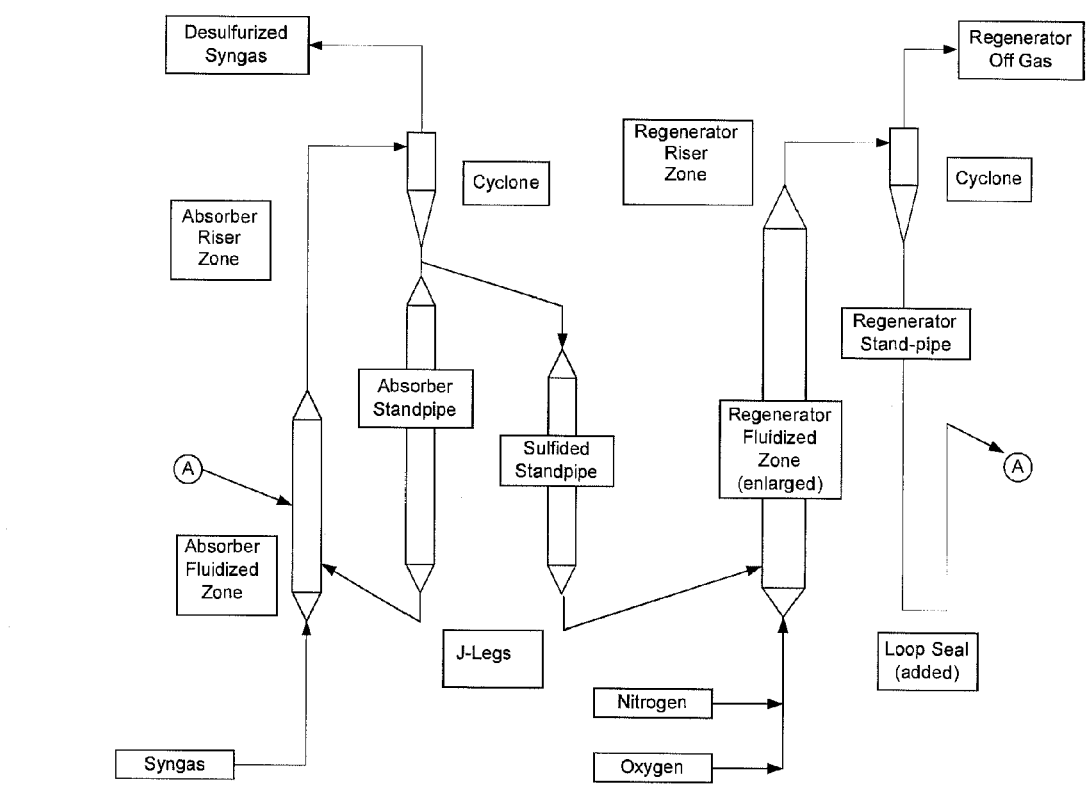
FIG. 6 is a schematic diagram of the dual loop process and apparatus used in Example 1.

A dual loop desulfurization pilot plant system schematically illustrated in FIG. 6 was utilized for this experiment. A zinc oxide based sorbent was used in the absorber. Specific dimensions of the different components in the dual loop pilot plant system are provided in Table 1. The experiments conducted with the dual loop apparatus are summarized in Table 2. These data are the average values for each experiment. The system was successful in increasing the ability to match the regeneration reaction rate to the absorption reaction rate and thus maintain a consistent sulfur concentration on the zinc oxide based sorbent and lower sulfur levels in the desulfurized syngas leaving the absorber cyclone.

TABLE 1

Dimensions of Dual Loop Components

| Zone | Nominal Diameter (inches) | Length (feet) |
|---|---|---|
| Absorber | | |
| Fluidized | 2.5 | 15 |
| Riser | 1.5 | 41 |
| Standpipe | 2.5 | 38 |
| J-leg | 1.0 | 9 |
| Sulfided standpipe | 2.0 | 39 |
| Sulfided J-leg | 0.8 | 9 |
| Regenerator | | |
| Fluidized | 2.5 | 25 |
| Riser | 1.0 | 7 |
| Standpipe | 2.0 | 14 |
| Loop seal | 2.0 | 10 |

Experiments summarized in Table 2 were used to vary process conditions (e.g. temperature, pressure, residence time, etc.) for the absorber reactor loop in order to learn the relationship between absorber performance, as measured by sulfur removal, and the process variable.

TABLE 2

Desulfurization Performance

| Duration (hours) | Pressure (psig) | Absorber Temp. (F.) | Absorber Residence Time (sec) | Regen. Temp. (F.) | Inlet H2S (ppm) | Inlet COS (ppm) | Total Inlet Sulfur (ppm) | Exit H2S (ppm) | Exit COS (ppm) | Exit SO2 (ppm) | Total Exit Sulfur (ppm) | Sulfur Removal (%) |
|---|---|---|---|---|---|---|---|---|---|---|---|---|
| 51.8 | 300 | 941 | 4.6 | 1,273 | 9,416 | 404 | 9,820 | 0.3 | 0.1 | 0.0 | 0.4 | 100.00 |
| 16.6 | 299 | 929 | 5.0 | 1,269 | 9,095 | 387 | 9,481 | 1.4 | 2.5 | 0.1 | 4.0 | 99.96 |
| 59.8 | 299 | 930 | 5.0 | 1,284 | 9,348 | 393 | 9,741 | 1.9 | 4.0 | 0.1 | 6.0 | 99.94 |
| 109.7 | 300 | 935 | 6.2 | 1,364 | 8,010 | 412 | 8,422 | 6.5 | 2.3 | 0.0 | 8.8 | 99.90 |
| 48.1 | 450 | 935 | 6.5 | 1,352 | 7,660 | 496 | 8,156 | 5.5 | 0.2 | 0.0 | 5.7 | 99.93 |
| 149.2 | 599 | 937 | 8.3 | 1,321 | 7,885 | 436 | 8,321 | 6.2 | 0.7 | 0.0 | 6.9 | 99.92 |
| 13.2 | 300 | 930 | 5.2 | 1,321 | 7,993 | 411 | 8,403 | 6.0 | 0.4 | 0.0 | 6.4 | 99.92 |
| 10.2 | 300 | 928 | 5.1 | 1,342 | 7,900 | 420 | 8,320 | 3.8 | 0.3 | 0.0 | 4.1 | 99.95 |
| 124.5 | 600 | 933 | 7.2 | 1,331 | 7,662 | 416 | 8,077 | 5.6 | 2.6 | 0.1 | 8.3 | 99.90 |
| 140.6 | 600 | 939 | 7.4 | 1,379 | 7,704 | 515 | 8,219 | 4.7 | 0.6 | 0.0 | 5.4 | 99.93 |
| 39.5 | 590 | 931 | 7.9 | 1,347 | 8,137 | 358 | 8,495 | 12.0 | 0.4 | 0.0 | 12.4 | 99.85 |
| 31.7 | 600 | 942 | 8.5 | 1,311 | 8,568 | 138 | 8,706 | 0.8 | 2.3 | 0.2 | 3.3 | 99.96 |
| 15.2 | 597 | 928 | 8.7 | 1,309 | 8,391 | 132 | 8,523 | 4.0 | 0.8 | 0.0 | 4.9 | 99.94 |
| 50.2 | 605 | 836 | 7.7 | 1,388 | 8,574 | 135 | 8,709 | 17.1 | 1.0 | 0.0 | 18.1 | 99.79 |
| 34.3 | 599 | 828 | 8.3 | 1,241 | 8,298 | 141 | 8,439 | 3.3 | 1.9 | 0.0 | 5.2 | 99.94 |
| 121.4 | 300 | 830 | 4.9 | 1,309 | 8,780 | 147 | 8,928 | 3.3 | 3.3 | 1.3 | 8.0 | 99.91 |
| 85.8 | 300 | 875 | 4.9 | 1,318 | 6,025 | 148 | 6,173 | 8.2 | 1.0 | 0.0 | 9.3 | 99.85 |
| 15.4 | 353 | 867 | 4.3 | 1,204 | 6,255 | 165 | 6,419 | 5.1 | 0.5 | 0.0 | 5.6 | 99.91 |
| 7.1 | 385 | 885 | 6.6 | 1,236 | 6,224 | 270 | 6,495 | 8.6 | 0.7 | 0.0 | 9.3 | 99.86 |
| 109.3 | 436 | 867 | 5.5 | 1,344 | 6,232 | 260 | 6,492 | 7.3 | 0.6 | 0.0 | 8.0 | 99.88 |
| 102.2 | 450 | 828 | 5.4 | 1,260 | 6,265 | 329 | 6,594 | 4.7 | 1.7 | 0.3 | 6.7 | 99.90 |
| 262.9 | 394 | 794 | 5.6 | 1,298 | 6,186 | 259 | 6,445 | 9.5 | 1.3 | 0.0 | 10.8 | 99.83 |
| 28.6 | 444 | 806 | 6.2 | 1,154 | 6,559 | 241 | 6,801 | 2.3 | 0.1 | 0.0 | 2.4 | 99.96 |
| 68.4 | 400 | 827 | 5.3 | 1,193 | 6,240 | 214 | 6,453 | 9.2 | 0.1 | 0.0 | 9.3 | 99.86 |
| 70.4 | 450 | 886 | 7.6 | 1,291 | 6,494 | 214 | 6,708 | 3.5 | 0.2 | 0.0 | 3.8 | 99.94 |
| 45.1 | 450 | 805 | 5.9 | 1,221 | 6,485 | 228 | 6,713 | 10.5 | 0.9 | 0.0 | 11.4 | 99.83 |
| 276.2 | 450 | 800 | 5.2 | 1,332 | 6,576 | 250 | 6,826 | 17.2 | 1.0 | 0.0 | 18.2 | 99.73 |
| 108.4 | 349 | 748 | 5.3 | 1,202 | 7,518 | 291 | 7,810 | 8.6 | 2.3 | 0.3 | 11.2 | 99.86 |
| 7.5 | 422 | 787 | 5.4 | 1,238 | 5,866 | 64 | 5,930 | 15.2 | 1.6 | 0.3 | 17.1 | 99.71 |
| 76.7 | 448 | 800 | 5.8 | 1,168 | 7,032 | 83 | 7,115 | 11.0 | 0.5 | 0.0 | 11.4 | 99.84 |
| 17.0 | 450 | 802 | 6.1 | 1,227 | 7,242 | 70 | 7,311 | 26.5 | 1.1 | 0.0 | 27.6 | 99.62 |
| 140.3 | 450 | 800 | 6.1 | 1,335 | 7,166 | 72 | 7,238 | 20.2 | 0.4 | 0.0 | 20.6 | 99.72 |
| 345.8 | 457 | 830 | 5.3 | 1,285 | 6,707 | 57 | 6,764 | 16.0 | 0.4 | 0.0 | 16.3 | 99.76 |
| 213.5 | 470 | 754 | 6.0 | 1,351 | 6,781 | 59 | 6,839 | 16.2 | 3.3 | 0.0 | 19.5 | 99.71 |
| 20.8 | 450 | 797 | 5.5 | 1,285 | 6,867 | 57 | 6,924 | 4.6 | 0.3 | 0.0 | 4.8 | 99.93 |

Volatile Metal Removal

Special sampling was conducted to determine the fate of volatile metals, specifically arsenic (As), cadmium (Cd), mercury (Hg), and selenium (Se), that are often present in coal-derived syngas. For these experiments slip streams of the feed syngas and the desulfurized syngas were metered into a series of "traps" designed to remove the volatile metals from the syngas. The "traps" were then analyzed off-site for metal content. Three different capture methods (traps) were used as described below:

Charcoal Adsorption Method

The sample train consisted of three (3) sorbent sampling tubes, each containing 1.0 gram of acid-washed, coconut-shell charcoal, placed in series. Gas from each location was fed to the sample tubes at a rate of 0.5 standard liters per minute over a 2-hour period for a total sample volume of 60 standard liters.

Iodine Monochloride Impinger Method

The sample train consisted of three (3) impingers, each containing 100 ml of a 16% iodine Monochloride solution prepared in glacial acetic acid. Gas from each location was fed to the sample tubes at a rate of 14.2 standard liters per minute (0.5 scfm) over a 2-hour period for a total sample volume of 852 standard liters (60 scf).

Potassium Permanganate Impinger Method

The sample train consisted of initial impingers containing 20% sodium hydroxide solution to remove $H_2S$ followed by impingers containing 100 ml of 4% potassium permanganate in 10% sulfuric acid solutions to capture mercury. The feed syngas was sampled at a rate of 8.5 standard liters per minute (0.3 scfm) for 90 minutes for a total sample volume of 765 standard liters (27 scf). The desulfurized syngas was sampled for 2 hours at a rate of 14.2 standard liters per minute (0.5 scfm) for a total sample volume of 1,704 standard liters (60 scf).

The above sampling was conducted a total of 5 times over a 3 day period. The results of the testing are summarized in Table 3. Process conditions were held relatively constant for the five sampling periods and were as follows:

Absorber Temperature: 895° F.
Absorber Pressure: 450 psig
Syngas Feed Rate, Sample 1: 7,160 scfh
    Samples 2-5: 4,993 scfh
Regenerator Temperature: 1,303° F.

As can be seen from these data, the apparatus shown in FIG. 6 also removed about 92% of the arsenic and over 97% of the selenium present in the syngas. The mercury data were inconclusive for both the charcoal and permanganate methods.

TABLE 3

Volatile Metal Removal

| Impurity | Capture Method | Concentration, µg/Nm³ | | % Removal |
| --- | --- | --- | --- | --- |
| | | Feed Syngas | Desulfurized Syngas | |
| Arsenic | Charcoal | 921 | 79 | 91.4% |
| Arsenic | ICl | 884 | 66 | 92.5% |
| Cadmium | Charcoal | ND (<1.2) | ND (<1.2) | — |
| Mercury | Charcoal | 28.4 | 104 | −266.2% |
| Mercury | Permanganate | 74.7 | 55.5 | 25.7% |
| Selenium | Charcoal | 157 | <4.7 | >97.0% |

In addition to the above gas analysis, samples of the ZnO sorbent were periodically removed from the dual loop reactor system. These samples were analyzed for arsenic and selenium content. These data are presented in Table 4. As can be seen in the data, the arsenic and selenium content increases as the total amount of operating time increases.

TABLE 4

Arsenic and Selenium Content on ZnO Sorbent

| Sample | Arsenic (µg/g) | Selenium (µg/g) |
| --- | --- | --- |
| Unexposed | <1.25 | <1.25 |
| Sample 1 | 167 | 2.81 |
| Sample 2 | 525 | 22.7 |
| Sample 3 | 713 | 53.9 |
| Sample 4 | 1480 | 96.8 |

After 1,500 hours of operation, ZnO sorbent samples removed from the reactor system were also analyzed for sulfate. The unexposed sorbent sample was found to have <0.1% sulfur as sulfate. The sample taken after 1,500 hours of operation was found to also have <0.1% sulfur as sulfate. Thus, the sulfate concentration after 1,500 hours of operation was essentially identical to the unexposed sorbent sample indicating that sulfate formation had not occurred.

Example 2

This example illustrates a process control where in the sulfur absorption rate was used to predict the amount of air needed to maintain a balanced removal of sulfur in the absorber and regenerate zones in a system essentially as illustrated in FIG. 3. The following equation was programmed into the control system:

$$\text{Air required} = \text{alpha} \times \text{Absorption rate (pounds of sulfur per hour)}$$

where
Alpha = $a_1 \times a_2 \times a_3 \times a_4$;
$a_1$ = stoichiometric oxygen required per mole of sulfur in reaction I (1.5 moles of oxygen per mole of sulfur);
$a_2$ = molar volume of ideal gas at standard conditions (359 cubic feet/lbmole);
$a_2$ = molar weight of sulfur (32 lb/lbmole); and
$a_4$ = concentration of oxygen in air (0.21 moles of oxygen/mole of air).

Figure 7:
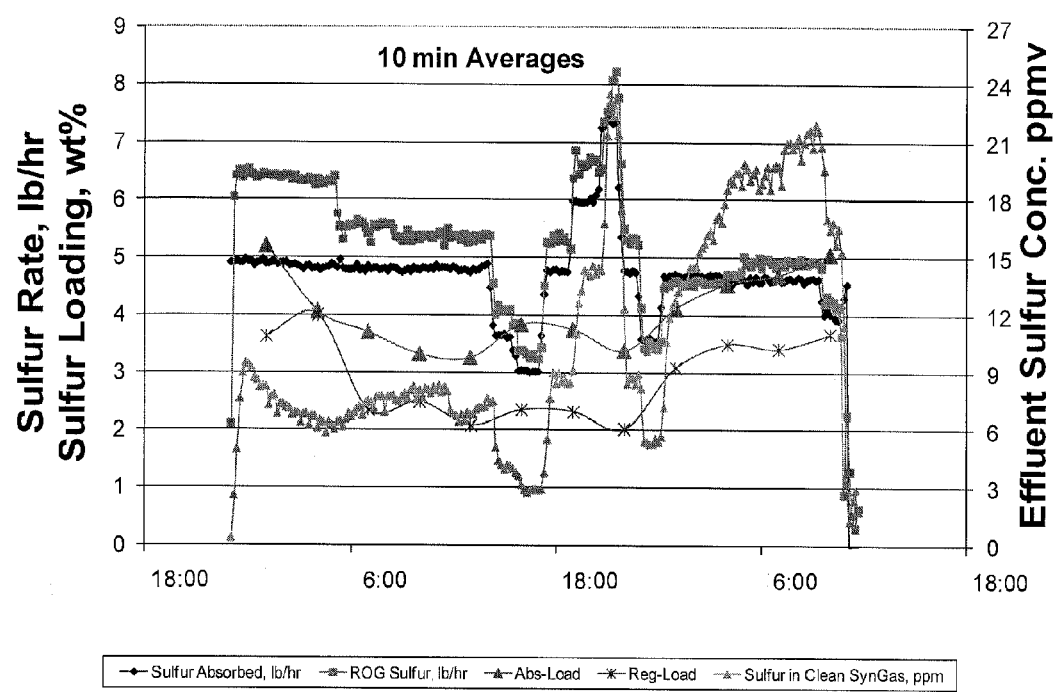
FIG. 7 graphically illustrates the ability of the feed forward control scheme described in Example 2 to maintain relatively constant sorbent sulfur loading even during significant changes in the sulfur absorption rate.

The calculated air requirement was then used as a remote set point for the air flow controller. The operators were then allowed to add a bias between −100 and +100 scfh to allow for any measurement inaccuracies. FIG. 7 provides an example of how well the feed forward control scheme was able to maintain relatively constant sorbent sulfur loading even during significant changes in the sulfur absorption rate caused by intentional changes to the syngas feed rate. In FIG. 7, "Sulfur Absorbed" refers to the calculated amount of sulfur removed from the syngas and loaded onto the sorbent in the absorber. "ROG Sulfur" refers to the calculated amount of sulfur released from the sorbent during regeneration and removed in the regeneration off-gas. "Abs-Load" refers to the sulfur loading on the sorbent determined by samples removed from the absorber standpipe. "Reg-Load" refers to the sulfur loading on the sorbent determined by samples removed from the regenerator standpipe. "Sulfur in Clean SynGas" refers to the total ($H_2S$ and COS) present in the effluent syngas from the absorber.

What is claimed is:

1. A process for removing impurities from a gas, comprising:
    (a) contacting an impurity containing feed gas stream with a solid sorbent stream in a fluidized absorber zone under conditions sufficient to reduce an impurity content of the feed gas stream and increase impurity loading of the solid sorbent stream;
    (b) removing an impurity loaded solid sorbent stream from the absorber zone and transporting at least a portion of the impurity loaded solid sorbent stream to a first non-mechanical gas seal forming solids transfer zone, the first solids transfer zone being fluidly connected to a fluidized solids regenerator zone and adapted to transfer solids to the fluidized regenerator zone at a controllable flow rate in response to the flow of an aeration gas through the transfer zone;
    (c) transferring the impurity loaded solid sorbent stream from the first solids transfer zone to the fluidized solids regenerator zone and contacting the impurity loaded solid sorbent stream with a regenerator feed gas in the fluidized solids regenerator zone to thereby reduce the impurity content of the impurity loaded solid sorbent stream;
    (d) transferring the solid sorbent stream of reduced impurity content from the fluidized regenerator zone to a second non-mechanical gas seal forming solids transfer zone, the second solids transfer zone being fluidly connected to the regenerator and absorber zones and adapted to transfer the solid sorbent stream of reduced impurity content to the absorber zone at the same flow rate as the flow rate of the solid sorbent stream of reduced impurity into the second solids transfer zone;
    (e) transporting at least a portion of the impurity loaded solid sorbent stream removed from the fluidized absorber zone to a third non-mechanical gas seal forming solids transfer zone, the third solids transfer zone being fluidly connected for receiving the portion of the impurity loaded solid sorbent stream from a downstream portion of the fluidized absorber zone and for delivering the portion of the impurity loaded solid sorbent stream to an upstream portion of the fluidized absorber zone, the third solids transfer zone being adapted to transfer solids to the fluidized absorber zone at a controllable flow rate in response to the flow of an aeration gas through the transfer zone;
    (f) transferring the portion of the impurity loaded solid sorbent stream from the third solids transfer zone to the upstream portion of the fluidized absorber zone for contact with the impurity containing feed gas stream; and
    (g) recovering a purified gas stream from the absorber zone.

2. The process according to claim 1, additionally comprising:
    measuring the pressures of the absorber and regenerator zones;
    determining the pressure difference between said zones;
    comparing said pressure difference to at least one predetermined pressure difference value; and
    adjusting the pressure in at least one of said absorber and regeneration zones in response to said measuring step.

3. The process according to claim 2, wherein said predetermined pressure difference value comprises a pressure difference in the range of between about 7 kPa and about 138 kPa.

4. The process according to claim 3, wherein said predetermined pressure difference value comprises a pressure difference in the range of between about 14 kPa and about 69 kPa.

5. The process according to claim 2, wherein said adjusting step comprises adjusting the pressure of the regenerator zone.

6. The process according to claim 2, wherein said adjusting step comprises adjusting the pressure of impurity laden gases exiting the regenerator zone.

7. The process according to claim 1, additionally comprising:
    determining a quantitative impurity removal rate in the absorber zone;
    comparing said impurity removal rate to a predetermined control value; and
    adjusting the flow rate of the regenerator feed gas fed to said regenerator zone in response to said comparing step.

8. The process according to claim 1, additionally comprising:
    determining a quantitative impurity removal rate in the absorber zone;
    determining a quantitative impurity removal rate in the regenerator zone;
    comparing said impurity removal rates to a predetermined control value; and
    adjusting the flow rate of the regenerator feed gas fed to said regenerator zone in response to said comparing step.

9. The process according to claim 1, additionally comprising:
    determining impurity loading of a sample of the impurity loaded sorbent stream removed from the absorber zone;
    comparing said impurity loading to a predetermined control value; and
    adjusting the flow rate of the regenerator feed gas fed to said regenerator zone in response to said comparing step.

10. The process according to claim 1, wherein said second solids transfer zone comprises a loop seal.

11. The process according to claim 1, wherein said impurity loaded sorbent stream is contacted with oxygen in the fluidized regenerator zone.

12. The process according to claim 11, wherein said impurity loaded sorbent stream is contacted with a mixture of oxygen and at least one inert gas in the fluidized regenerator zone.

13. The process according to claim 1, wherein a cyclone separator separates said impurity loaded sorbent stream and said purified gas removed from the absorber zone.

14. The process according to claim 13, wherein said impurity loaded sorbent stream leaving the cyclone separator passes through a gas stripper.

15. The process according to claim 1, wherein the temperature of the fluidized absorber zone ranges from 316 to 649° C.

16. The process according to claim 15, wherein the temperature of the fluidized absorber zone ranges from 371 to 538° C.

17. The process according to claim 1, wherein the pressure of the impurity-containing feed gas ranges from 689 to 8,274 kPa.

18. The process according to claim 1, wherein the impurity comprises at least one material selected from the group consisting of sulfur compounds, arsenic and compounds thereof, and selenium and compounds thereof.

19. The process according to claim 1, wherein the solid sorbent stream comprises at least one active metal oxide selected from the group consisting of iron oxide, zinc oxide, zinc ferrite, copper ferrite, copper oxide, vanadium oxide, and mixtures thereof.

20. The process according to claim 1, wherein the solid sorbent stream has an average particle diameter from 50 to 140 microns.

21. The process according to claim 1, wherein said impurity containing feed gas stream is contacted with said solid sorbent stream in said fluidized absorber zone for a residence time of about 3 to about 25 seconds.

22. The process according to claim 21, wherein the residence time in the fluidized absorber zone ranges from 3 to 10 seconds.

23. The process according to claim 1, wherein said impurity loaded solid sorbent stream is contacted with said regenerator feed gas in said fluidized solids regenerator zone for a residence time of from about 3 to about 25 seconds.

24. The process according to claim 1, wherein the impurity content of the impurity loaded sorbent exiting the absorber zone ranges from 10% to 90% of the impurity adsorption capacity of the sorbent.

25. The process according to claim 24, wherein the impurity content ranges from 30% to 75% of the impurity adsorption capacity of the sorbent.

26. The process according to claim 1, wherein the arsenic content of the impurity loaded sorbent exiting the absorber zone ranges from 0 to 3000 ppm.

27. The process according to claim 1, wherein the purified gas stream recovered from the fluidized absorber zone has a sulfur level of less than or equal to 50 ppm.

28. The process according to claim 27, wherein the purified gas stream has a sulfur level of less than or equal to 20 ppm.

29. The process according to claim 28, wherein the purified gas stream has a sulfur level of less than or equal to 10 ppm.

30. The process according to claim 1, wherein the temperature of the fluidized regenerator zone ranges from 482 to 788° C.

31. The process according to claim 30, wherein the temperature of the fluidized regenerator zone ranges from 649 to 788° C.

32. The process according to claim 1, further comprising heating the fluidized regenerator zone by at least one of the following: 1) adding a pyrophoric additive; 2) adding a supplementary fuel; and 3) using a dry gas preheating system.

33. The process according to claim 1, wherein said first solids transfer zone comprises a J-Leg.

34. The process according to claim 33, wherein the said first solids transfer zone comprises:
(a) a descending pipe in fluid communication with a holding vessel; and
(b) a transfer pipe in fluid communication with the descending pipe to transfer the impurity loaded sorbent from the descending pipe to the fluidized regenerator zone;
and wherein an angle between the descending pipe and the transfer pipe is less than or equal to 90°.

35. The process according to claim 34, wherein the diameter of the transfer pipe is less than the diameter of the holding vessel.

36. The process according to claim 35, where in the descending pipe comprises a flow restrictor.

37. The process according to claim 34, wherein aeration gas is introduced into one or more of the holding vessel, the descending pipe, and the transfer pipe.

38. The process according to claim 1, wherein said third solids transfer zone comprises a J-Leg.

39. The process according to claim 38, wherein the said third solids transfer zone comprises:
(a) a descending pipe in fluid communication with a holding vessel; and
(b) a transfer pipe in fluid communication with the descending pipe to transfer the portion of the impurity loaded solid sorbent stream from the descending pipe to the fluidized absorber zone;
and wherein an angle between the descending pipe and the transfer pipe is less than or equal to 90°.

40. The process according to claim 39, wherein the diameter of the transfer pipe is less than the diameter of the holding vessel.

41. The process according to claim 40, where in the descending pipe comprises a flow restrictor.

42. The process according to claim 39, wherein aeration gas is introduced into one or more of the holding vessel, the descending pipe, and the transfer pipe.

43. A fluidized reactor system for removing impurities from a gas, comprising:
(a) a fluidized absorber adapted for contacting an impurity containing feed gas stream with a solid sorbent stream zone under conditions sufficient to reduce the impurity content of said feed gas stream and increase the impurity loading of the solid sorbent stream;
(b) a fluidized solids regenerator adapted for contacting an impurity loaded solid sorbent stream with a regeneration gas under conditions sufficient to reduce the impurity content of said impurity loaded solid sorbent stream;
(c) a first non-mechanical gas seal forming solids transfer device in fluid communication with said fluidized absorber, said fluidized solids regenerator, and a supply of aeration gas, said first non-mechanical gas seal forming solids transfer device being adapted and arranged to receive an impurity loaded solid sorbent stream from said absorber and to transport said impurity loaded solid sorbent stream to said fluidized regenerator at a controllable flow rate in response to said aeration gas;
(d) a second non-mechanical gas seal forming solids transfer device fluidly connected to said fluidized regenerator and said fluidized absorber, and being adapted to receive a solid sorbent stream of reduced impurity content from said fluidized regenerator and to transfer said solid sorbent stream of reduced impurity content to said fluidized absorber without changing the flow rate of said solid sorbent stream of reduced impurity content; and
(e) a third non-mechanical gas seal forming solids transfer device fluidly connected to a downstream portion of said fluidized absorber, an upstream portion of said fluidized absorber, and a supply of aeration gas, and being adapted and arranged to receive a portion of the impurity loaded solid sorbent stream from the downstream portion of the fluidized absorber and transfer the portion of the impurity loaded solid sorbent stream to the upstream portion of said fluidized absorber at a controllable flow rate in response to said aeration gas.

44. The system according to claim 43, wherein said third non-mechanical gas seal forming solids transfer device comprises a J-Leg.

45. The system according to claim 44, wherein said third non-mechanical gas seal forming solids transfer device comprises:
(a) a descending pipe in fluid communication with a holding vessel; and (b) a transfer pipe in fluid communication with the descending pipe to transfer the portion of the impurity loaded solid sorbent stream from the descending pipe to the fluidized absorber;

and wherein an angle between the descending pipe and the transfer pipe is less than or equal to 90°.

46. The system according to claim 43, wherein said first non-mechanical gas seal forming solids transfer device comprises a J-Leg.

47. The system according to claim 46, wherein said first non-mechanical gas seal forming solids transfer device comprises:

(a) a descending pipe in fluid communication with a holding vessel; and (b) a transfer pipe in fluid communication with the descending pipe to transfer the impurity loaded sorbent from the descending pipe to the fluidized regenerator;

and wherein an angle between the descending pipe and the transfer pipe is less than or equal to 90°.

48. The system according to claim 45, wherein the diameter of the transfer pipe is less than the diameter of the holding vessel.

49. The system according to claim 48, wherein the descending pipe comprises a flow restrictor.

50. The system according to claim 45, wherein at least one of the holding vessel, the descending pipe, and the transfer pipe is configured to receive the aeration gas.

51. The system according to claim 43, wherein said second non-mechanical gas seal forming solids transfer device comprises a loop seal.

52. The system according to claim 43, additionally comprising:

one or more sensors adapted and arranged to measure the pressure of an effluent gas of the absorber and an effluent gas of the regenerator or to measure the pressure differential between the two effluent gases;

a controller connected to said one or more sensors, the controller configured to receive pressure or pressure differential input measurements from said one or more sensors and to compare the pressure difference between the two effluent gases to a predetermined pressure difference value, said controller also being connected to a controllable valve adapted and arranged to adjust pressure of the effluent gas of the regenerator based on instructions received from the controller.

53. The system according to claim 43, additionally comprising:

a controller configured to receive inputs enabling determination of a quantitative impurity removal rate in the absorber and configured to compare the impurity removal rate to a predetermined control value, said controller being connected to a controllable valve adapted and arranged to adjust the flow rate of the regeneration gas fed to said regenerator based on instructions received from the controller.

54. The system according to claim 43, further comprising a cyclone separator adapted and arranged to separate an effluent from the absorber into an impurity loaded sorbent stream and a purified gas.

55. The system according to claim 54, further comprising a gas stripper adapted and arranged to receive the impurity loaded sorbent stream leaving the cyclone separator.

* * * * *